(12) United States Patent
Kuwabara et al.

(10) Patent No.: US 11,249,476 B2
(45) Date of Patent: Feb. 15, 2022

(54) STEERING HOLDING DETERMINATION DEVICE AND AUTONOMOUS DRIVING SYSTEM

(71) Applicant: Toyota Jidosha Kabushiki Kaisha, Toyota (JP)

(72) Inventors: Takahiko Kuwabara, Yokohama (JP); Toshihiro Tsutsui, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 16/683,565

(22) Filed: Nov. 14, 2019

(65) Prior Publication Data

US 2020/0159212 A1    May 21, 2020

(30) Foreign Application Priority Data

Nov. 16, 2018    (JP) .............................. JP2018-215961

(51) Int. Cl.
| | |
|---|---|
| *G05D 1/00* | (2006.01) |
| *B62D 6/10* | (2006.01) |
| *B60W 40/08* | (2012.01) |
| *B60W 50/00* | (2006.01) |

(52) U.S. Cl.
CPC ........... *G05D 1/0061* (2013.01); *B60W 40/08* (2013.01); *B62D 6/10* (2013.01); *G05D 1/0088* (2013.01); *B60W 2050/007* (2013.01); *B60W 2510/202* (2013.01)

(58) Field of Classification Search
USPC .......................................................... 701/41
See application file for complete search history.

(56) References Cited

U.S. PATENT DOCUMENTS

| 9,604,649 B1 * | 3/2017 | Pastor .................... B60W 40/09 |
| 2014/0371989 A1 * | 12/2014 | Trimboli .................. B62D 6/10 |
| | | 701/41 |
| 2018/0022385 A1 * | 1/2018 | Fu .......................... B60W 10/20 |
| | | 701/41 |
| 2018/0203444 A1 | 7/2018 | Matsumura |
| 2019/0300013 A1 * | 10/2019 | Shiraishi .............. G05D 1/0061 |
| 2020/0089225 A1 * | 3/2020 | Sadakiyo .............. B60W 30/02 |

FOREIGN PATENT DOCUMENTS

| JP | 2018-001907 A | 1/2018 |
| JP | 2018-075849 A | 5/2018 |
| JP | 2018-116429 A | 7/2018 |

* cited by examiner

*Primary Examiner* — James M McPherson
(74) *Attorney, Agent, or Firm* — Dinsmore & Shohl LLP

(57) ABSTRACT

A steering holding determination device determines a steering holding state in which a driver of a vehicle holds a steering wheel of the vehicle in a steerable manner. The device includes a torque recognition unit that recognizes a steering torque based on a detection result of a torque sensor, a contact state recognition unit that recognizes a contact state or a non-contact state, a threshold value setting unit that sets a threshold value used for the steering holding state determination, based on a recognition result of the contact state recognition unit, and a steering holding determination unit that determines that the driver is in the steering holding state, when the steering torque is equal to or greater than the threshold value. When the non-contact state is recognized, the threshold value setting unit sets the threshold value to a larger value compared to a case when the contact state is recognized.

10 Claims, 27 Drawing Sheets

Fig.3

| TOUCH SENSOR IS NORMAL | | TOUCH SENSOR IS IN FAILURE |
|---|---|---|
| WITHOUT DETECTION OF CONTACT USING TOUCH SENSOR: NON-CONTACT STATE | WITH DETECTION OF CONTACT USING TOUCH SENSOR: CONTACT STATE | NON-CONTACT STATE |

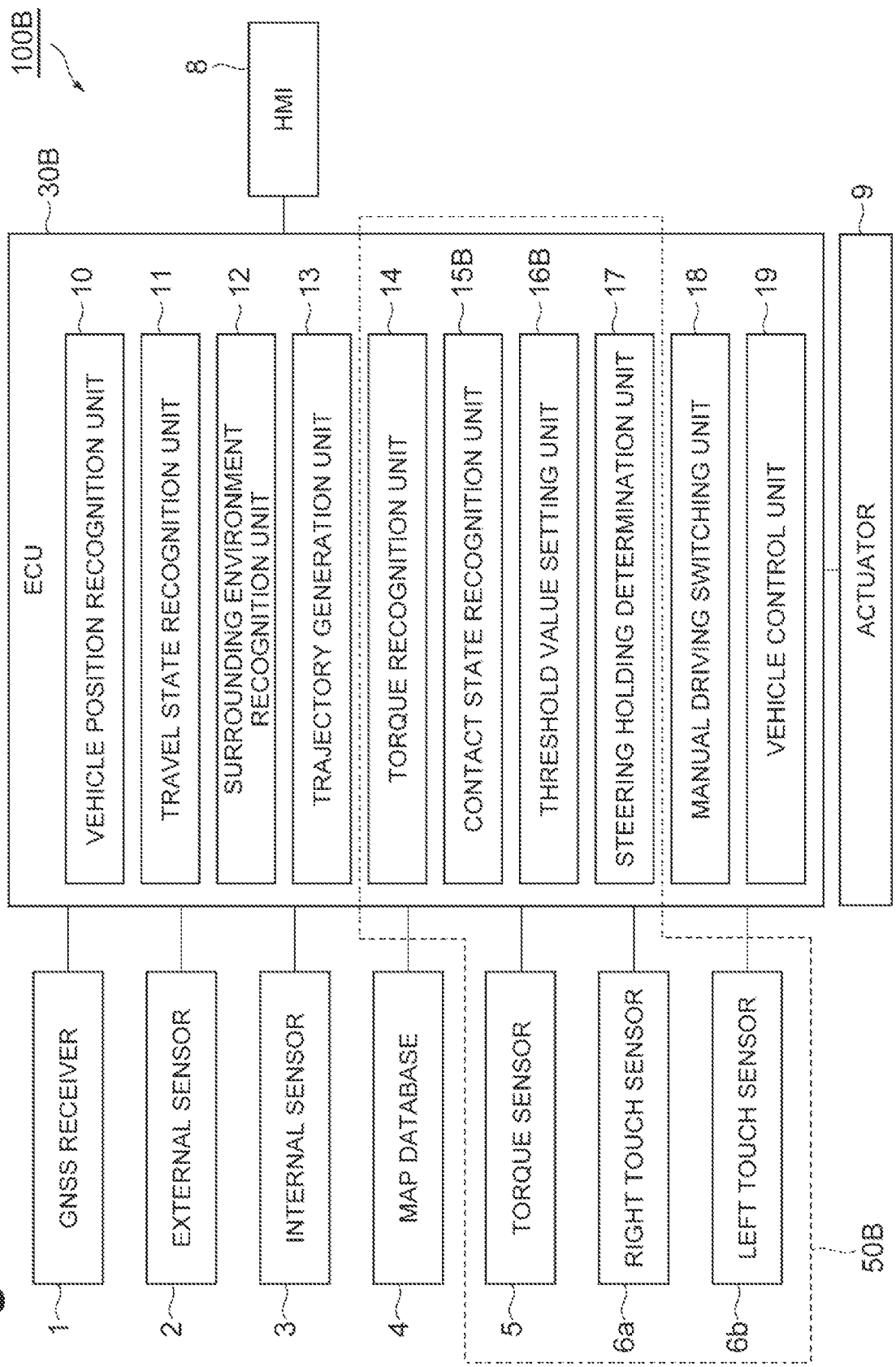

Fig. 9

| | RIGHT TOUCH SENSOR IS NORMAL | | | | | RIGHT TOUCH SENSOR IS IN FAILURE |
|---|---|---|---|---|---|---|
| LEFT TOUCH SENSOR IS NORMAL | WITHOUT DETECTION OF CONTACT USING BOTH TOUCH SENSORS: NON-CONTACT STATE | WITH DETECTION OF CONTACT USING RIGHT TOUCH SENSOR: ONE-HAND CONTACT STATE | WITH DETECTION OF CONTACT USING LEFT TOUCH SENSOR: ONE-HAND CONTACT STATE | WITH DETECTION OF CONTACT USING BOTH TOUCH SENSORS: TWO-HAND CONTACT STATE | WITHOUT DETECTION OF CONTACT USING RIGHT TOUCH SENSOR: NON-CONTACT STATE | WITHOUT DETECTION OF CONTACT USING LEFT TOUCH SENSOR: NON-CONTACT STATE |
| | | | | | WITH DETECTION OF CONTACT USING RIGHT TOUCH SENSOR: TWO-HAND CONTACT STATE | WITH DETECTION OF CONTACT USING LEFT TOUCH SENSOR: TWO-HAND CONTACT STATE |
| LEFT TOUCH SENSOR IS IN FAILURE | | | | | | NON-CONTACT STATE |

Fig. 16

| GRIPPING FORCE SENSOR IS NORMAL | GRIPPING FORCE SENSOR IS IN FAILURE |
|---|---|
| WITHOUT DETECTION OF GRIPPING USING GRIPPING FORCE SENSOR: NON-GRIPPING STATE | NON-GRIPPING STATE |
| WITH DETECTION OF GRIPPING USING GRIPPING FORCE SENSOR: GRIPPING STATE | |

Fig.20

| | RIGHT GRIPPING FORCE SENSOR IS NORMAL | RIGHT GRIPPING FORCE SENSOR IS IN FAILURE |
|---|---|---|
| LEFT GRIPPING FORCE SENSOR IS NORMAL | WITHOUT DETECTION OF GRIPPING USING BOTH GRIPPING FORCE SENSOR: NON-GRIPPING STATE / WITH DETECTION OF GRIPPING USING RIGHT GRIPPING FORCE SENSOR: ONE-HAND GRIPPING STATE / WITH DETECTION OF GRIPPING USING LEFT GRIPPING FORCE SENSOR: ONE-HAND GRIPPING STATE / WITH DETECTION OF GRIPPING USING BOTH GRIPPING FORCE SENSOR: TWO-HAND GRIPPING STATE | WITHOUT DETECTION OF GRIPPING USING LEFT GRIPPING FORCE SENSOR: NON-GRIPPING STATE / WITH DETECTION OF GRIPPING USING LEFT GRIPPING FORCE SENSOR: TWO-HAND GRIPPING STATE |
| LEFT GRIPPING FORCE SENSOR IS IN FAILURE | WITHOUT DETECTION OF GRIPPING USING RIGHT GRIPPING FORCE SENSOR: NON-GRIPPING STATE / WITH DETECTION OF GRIPPING USING RIGHT GRIPPING FORCE SENSOR: TWO-HAND GRIPPING STATE | NON-GRIPPING STATE |

STEERING HOLDING DETERMINATION DEVICE AND AUTONOMOUS DRIVING SYSTEM

CROSS-REFERENCE TO RELATED APPLICATION

This application claims the benefit of priority from Japanese Patent Application No. 2018-215961, filed on Nov. 16, 2018, the entire contents of which are incorporated herein by reference.

TECHNICAL FIELD

The present disclosure relates to a steering holding determination device and an autonomous driving system.

BACKGROUND

In the related art, a driving assistance device is disclosed with regard to a driving assistance control, which determines that a gripping driving state has occurred if any one of the following cases is satisfied: when a contact detection sensor detects that a driver is in contact with a steering wheel and when a magnitude of a steering torque measured by a steering torque sensor is equal to or greater than a threshold value (for example, Japanese Unexamined Patent Publication No. 2018-75849).

SUMMARY

Incidentally, in some cases, it is required to determine whether the driver is in a steering holding state in which the steering wheel of a vehicle can be kept in a steerable manner. If the determination of this steering holding state is based on whether or not a steering torque of a steering shaft is equal to or greater than the threshold value, it may be erroneously determined that the driver is in the steering holding state even though the driver does not intend to hold the steering wheel in such a case where there is a torque input to the steering shaft due to a road surface disturbance or the like.

In this technical field, it is desirable to appropriately determine the driver's steering holding state based on the steering torque.

A steering holding determination device according to an aspect of the present disclosure is configured to determine a steering holding state in which a driver of a vehicle holds a steering wheel of the vehicle in a steerable manner based on a steering torque of a steering shaft. The steering holding determination device is configured to include a torque recognition unit configured to recognize a steering torque based on a result of detection performed by a torque sensor provided on the steering shaft, a contact state recognition unit configured to recognize a contact state in which a driver's contact to the steering wheel is detected or a non-contact state in which the contact is not detected, based on the result of detection performed by the touch sensor provided on the steering wheel, a first threshold value setting unit configured to set a first threshold value used for the determination of the steering holding state, based on a result of recognition performed by the contact state recognition unit, and a steering holding determination unit configured to determine that the driver is in the steering holding state, when the steering torque is equal to or greater than the first threshold value. When the non-contact state is recognized by the contact state recognition unit, the first threshold value setting unit is configured to set the first threshold value to a larger value compared to a case when the contact state is recognized by the contact state recognition unit.

According to the steering holding determination device in an aspect of the present disclosure, when the driver's contact with the steering wheel is not detected by the touch sensor, since the first threshold value is set to a larger value compared to the case when the driver's contact is detected, it becomes difficult for the steering holding determination unit to determine that the driver is in the steering holding state. Accordingly, it is possible to suppress the erroneous determination of the steering holding state even though the driver does not intend to hold the steering wheel in such a case where there is a torque input to the steering shaft caused by the road surface disturbance or the like when the driver's hand is away from the steering wheel. As a result, it is possible to appropriately determine the driver's steering holding state based on the steering torque.

In an embodiment, the contact state recognition unit may be configured to recognize whether the touch sensor is normal or in failure, and may recognize the non-contact state when it is recognized that the touch sensor is in failure. In this case, for example, even in the case of contact-ON failure of touch sensor where the driver's contact with the steering wheel is erroneously detected by touch sensor, since the state is regarded as a non-contact state, the first threshold value is set to a larger value compared to a case when the touch sensor detects driver's contact when the touch sensor is normal. As a result thereof, for example, even in a case of contact-ON failure of the touch sensor, it is possible to suppress the inappropriate determination of the driver's steering holding state.

In an embodiment, the touch sensor may be configured to include a right touch sensor and a left touch sensor. The contact state recognition unit may be configured to recognize the contact state based on the result of detection performed by the right touch sensor and the left touch sensor, while dividing the contact state into a two-hand contact state in which the contact is detected by the right touch sensor and the left touch sensor and a one-hand contact state in which the contact is detected by the right touch sensor or the left touch sensor. When the one-hand contact state is recognized by the contact state recognition unit, the first threshold value setting unit may be configured to set the first threshold value to a larger value compared to a case when the two-hand contact state is recognized by the contact state recognition unit. In this case, it is possible to appropriately set the steering torque threshold value using the right touch sensor and the left touch sensor.

In an embodiment, the contact state recognition unit may be configured to recognize whether each of the right touch sensor and the left touch sensor is normal or in failure. If it is recognized that any one of the right touch sensor and the left touch sensor is normal and the other is in failure, and when the contact is detected by the right touch sensor or the left touch sensor which is recognized as normal, the contact state recognition unit may be configured to recognize the two-hand contact state. In this case, since the contact is detected by the right touch sensor or the left touch sensor which is recognized as normal, there is a possibility that the driver may have an intention to hold the steering wheel. Therefore, the state is regarded as a two-hand contact state, and thus, the steering torque threshold value is set as a value when the driver's contact is detected by the right touch sensor and the left touch sensor when right touch sensor and left touch sensor are normal. As a result, it becomes easier for the steering holding determination unit to determine that the driver is in the steering holding state. As a result thereof, it is possible to appropriately set the first threshold value in response to the possibility of the driver's intention to hold the steering.

A steering holding determination device according to another aspect of the present disclosure is configured to determine a steering holding state in which a driver of a vehicle holds a steering wheel of the vehicle in a steerable manner based on a steering torque of a steering shaft. The steering holding determination device may be configured to include a torque recognition unit configured to recognize a steering torque based on a result of detection performed by a torque sensor provided on the steering shaft, a gripping state recognition unit configured to recognize a gripping state in which a driver's gripping of the steering wheel is detected, or a non-gripping state in which the gripping is not detected, based on a gripping force detected by a gripping force sensor provided on the steering wheel, a second threshold value setting unit configured to set a second threshold value used for the determination of the steering holding state, based on the result of recognition performed by the gripping state recognition unit, and a steering holding determination unit configured to determine that the driver is the steering holding state, when the steering torque is equal to or higher than the second threshold value. When the non-gripping state is recognized by the gripping state recognition unit, the second threshold value setting unit is configured to set the second threshold value to a larger value compared to a case when the gripping state is recognized by the gripping state recognition unit.

According to the steering holding determination device in another aspect of the present disclosure, when the driver's gripping is not detected by the gripping force sensor, since the second threshold value is set to a larger value compared to the case when the driver's gripping is detected, it becomes difficult for the steering holding determination unit to determine that the driver is in the steering holding state. Accordingly, it is possible to suppress the erroneous determination of the steering holding state even though the driver does not intend to hold the steering wheel in such a case where there is a torque input to the steering shaft caused by the road surface disturbance or the like when the driver's hand is away from the steering wheel. As a result, it is possible to appropriately determine the driver's steering holding state based on the steering torque.

In an embodiment, the gripping state recognition unit may be configured to recognize whether the gripping force sensor is normal or in failure, and may be configured to recognize the non-gripping state when it is recognized that the gripping force sensor is in failure. In this case, for example, even in a case of grip-ON failure of the gripping force sensor where the driver's gripping is erroneously detected by the gripping force sensor, since the state is regarded as a non-gripping state, the second threshold value is set to a larger value compared to a case when the gripping force sensor detects the driver's gripping when the gripping force sensor is normal. As a result thereof, for example, even in a case of grip-ON failure of the gripping force sensor, it is possible to suppress the inappropriate determination of the driver's steering holding state.

In an embodiment, the gripping force sensor may be configured to include a right gripping force sensor and a left gripping force sensor. The gripping state recognition unit may be configured to recognize the gripping state based on the result of detection performed by the right gripping force sensor and the left gripping force sensor, while dividing the gripping state into a two-hand gripping state in which the gripping is detected by the right gripping force sensor and the left gripping force sensor and a one-hand gripping state in which the gripping state is detected by the right gripping force sensor or the left gripping force sensor. When the one-hand gripping state is recognized by the gripping state recognition unit, the second threshold value setting unit may be configured to set the second threshold value to a larger value compared to a case when the two-hand gripping state is recognized by the gripping state recognition unit. In this case, it is possible to appropriately set the second threshold value using the right gripping force sensor and the left gripping force sensor.

In an embodiment, the gripping state recognition unit may be configured to recognize whether each of the right gripping force sensor and the left gripping force sensor is normal or in failure. If any one of the right gripping force sensor and the left gripping force sensor is recognized as normal and the other is in failure, and when the gripping is detected by the right gripping force sensor or the left gripping force sensor which is recognized as normal, the gripping state recognition unit may be configured to recognize the two-hand gripping state. In this case, since the gripping is detected by the right gripping force sensor or the left gripping force sensor which is recognized as normal, there is a possibility that the driver may have an intention to hold the steering wheel. Therefore, the state is regarded as the two-hand gripping state, and thus, the second threshold value is set as a value when the driver's gripping is detected by the right gripping force sensor and the left gripping force sensor when the right gripping force sensor and the left gripping force sensor are normal. As a result, it becomes easier for the steering holding determination unit to determine that the driver is in the steering holding state. As a result thereof, it is possible to appropriately set the second threshold value in response to the possibility of the driver's intention to hold the steering wheel.

An autonomous driving system according to an aspect of the present disclosure may be configured to perform a manual-driving switching control to switch a driving mode from an autonomous driving to a manual-driving based on a steering torque in a vehicle of which the driving mode can be switched between the autonomous driving and the manual-driving. The autonomous driving system may be configured to include the steering holding determination device described above, and a manual-driving switching unit configured to perform the manual-driving switching control when it is determined by the steering holding determination unit that the driver is in the steering holding state during the autonomous driving. According to the autonomous driving system in an aspect of the present disclosure, it possible to realize the appropriate switching of the driving mode to the manual-driving based on the result of determination of the driver's steering holding state appropriately determined based on the steering torque.

According to various aspects and embodiments of the present disclosure, it is possible to appropriately determine the driver's steering holding state based on the steering torque.

BRIEF DESCRIPTION OF THE DRAWINGS

FIG. 3 is a table illustrating an example of a content of recognition performed by a contact state recognition unit in FIG. 1.

FIG. 8 is a block diagram illustrating an autonomous driving system including a steering holding determination device according to a second embodiment.

FIG. 9 is a table illustrating an example of a content of recognition performed by a contact state recognition unit in FIG. 8.

FIG. 16 is a table illustrating an example of a content of recognition performed by a gripping state recognition unit in FIG. 15.

FIG. 20 is a table illustrating an example of a content of recognition performed by the gripping state recognition unit of FIG. 19.

DETAILED DESCRIPTION

Figure 1:
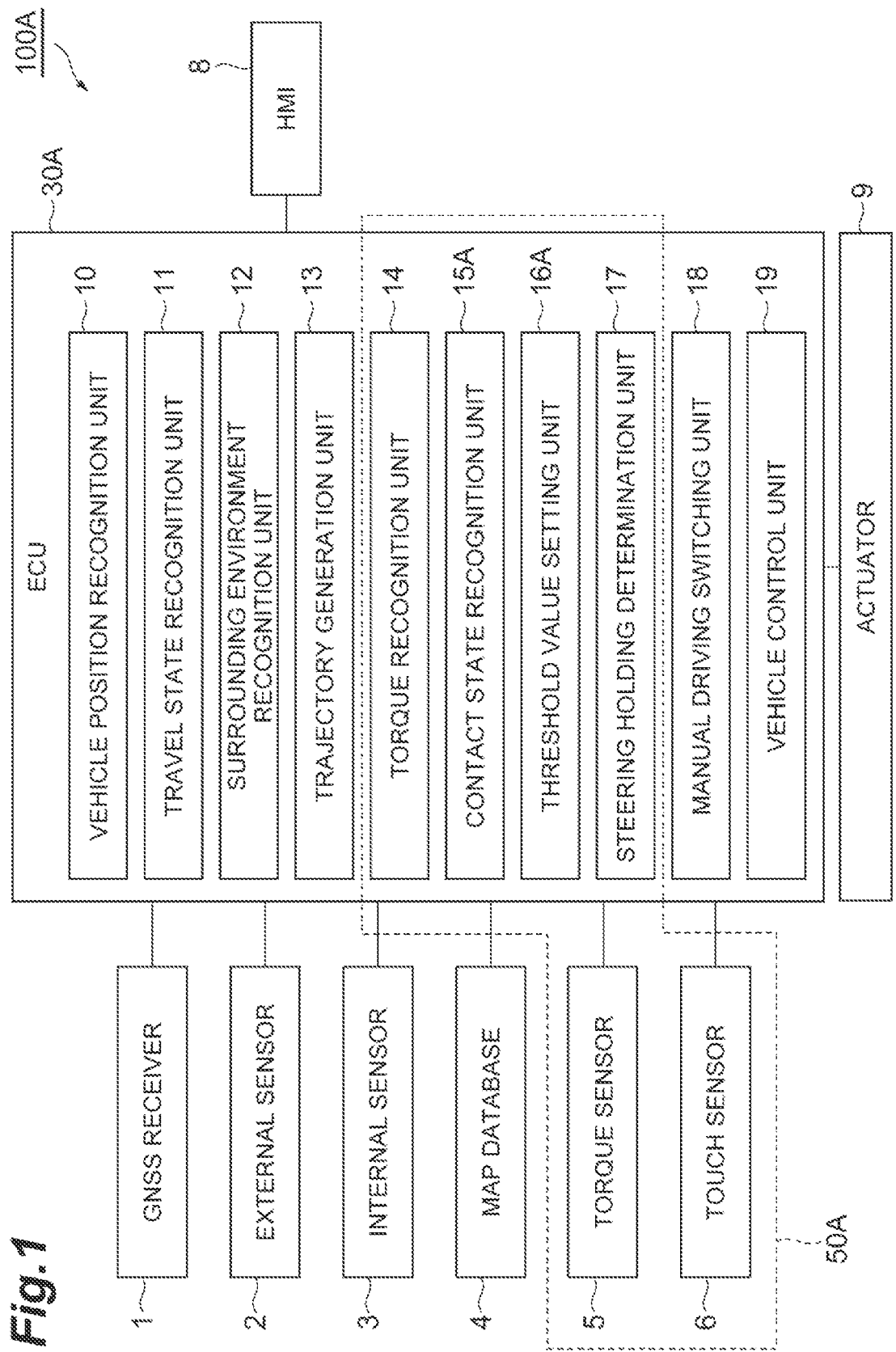
FIG. 1 is a block diagram illustrating an autonomous driving system including a steering holding determination device according to a first embodiment.

Hereinafter, embodiments of the present disclosure will be described with reference to the drawings. In the description below, the same reference numerals will be given to the same or corresponding elements, and the descriptions thereof will not be repeated.

First Embodiment

FIG. 1 is a block diagram illustrating an autonomous driving system 100A including a steering holding determination device 50A according to a first embodiment. The autonomous driving system 100A illustrated in FIG. 1 is mounted on a vehicle such as a passenger car and performs autonomous driving to make the vehicle drive autonomously. The autonomous driving is a vehicle control that drives the vehicle to the destination without being operated by a driver. The vehicle is configured to be switchable between the autonomous driving and a manual-driving by the autonomous driving system 100A. The manual-driving is a driving state in which the vehicle travels by the driver's driving operation.

The autonomous driving system 100A performs a manual-driving switching control to switch the driving from the autonomous driving to the manual-driving. The manual-driving switching control is a control to switch the driving from the autonomous driving to the manual-driving based on a steering torque recognized based on a result of measuring performed by the torque sensor 5 during the autonomous driving. In the present embodiment, as an example, if the vehicle in autonomous driving approaches a switching location which is a location where the autonomous driving terminates, the autonomous driving system 100A notifies the driver of the vehicle's approach to the switching location and performs the manual-driving switching control based on a steering operation torque by the driver's steering operation (for example, the steering operation for takeover) in response to the notification of the approach. The manual-driving switching control does not necessarily need to be performed when notifying the driver of the vehicle's approach to the switching location.

The steering holding determination device 50A configures a part of the autonomous driving system 100A. The steering holding determination device 50A determines a driver's steering holding state of the vehicle based on the steering torque of the steering shaft of the vehicle. The steering holding state in the present disclosure does not mean a state in which the driver is merely touching the steering wheel, but means a state in which the driver holds the steering wheel in a steerable manner. The state in which the steering wheel is held in the steerable manner means a state in which the driver is ready to immediately perform an operation (steering operation) for gripping and rotating the steering wheel. The autonomous driving system 100A performs the manual-driving switching control based on a result of determination performed by the steering holding determination device 50A.

Configuration of Steering Holding Determination Device 50A and Autonomous Driving System 100A As illustrated in FIG. 1, the autonomous driving system 100A according to the present embodiment includes an electronic control unit (ECU) 30A that performs an overall vehicle control for the autonomous driving. The ECU 30A is an electronic control unit including a central processing unit (CPU), read only memory (ROM), random access memory (RAM), a controller area network (CAN), and the like. The ECU 30A realizes various functions by, for example, loading the program stored in the ROM into the RAM, and executing the program loaded in the RAM by the CPU. The ECU 30A may be configured with a plurality of electronic control units.

The ECU 30A is connected to a global navigation satellite system (GNSS) receiver 1, an external sensor 2, an internal sensor 3, a map database 4, a torque sensor 5, a human machine interface (HMI) 8, and an actuator 9.

The GNSS receiver 1 measures a position of the vehicle (for example, the latitude and longitude of the vehicle) by receiving signals from three or more GNSS satellites. The GNSS receiver 1 transmits the information on the measured position of the vehicle to the ECU 30A.

The external sensor 2 is a detection device that detects a surrounding situation of the vehicle. The external sensor 2 includes at least one of a camera and a radar sensor.

The camera is an imaging device that images a surrounding situation of the vehicle. The camera is provided on the inside of a windshield of the vehicle. The camera transmits the imaging information regarding the external situation of the vehicle to the ECU 30A. The camera may be a monocular camera or may be a stereo camera. The stereo camera includes two imaging units arranged to reproduce binocular parallax. The imaging information of the stereo camera also includes information in the depth direction.

The radar sensor is a detection device that detects objects around the vehicle using radio waves (for example, millimeter waves) or light. The radar sensor includes, for example, at least one of the millimeter wave radar or a light detection and ranging (LIDAR). The radar sensor transmits the radio wave or light to the surroundings of the vehicle, and detects obstacles by receiving radio waves or light reflected from the obstacles. The radar sensor transmits the detected obstacle information to the ECU 30A.

The internal sensor 3 is a detection device that detects a traveling state of the vehicle. The internal sensor 3 includes a vehicle speed sensor, an accelerator sensor, and a yaw rate sensor. The vehicle speed sensor is a measuring device that measures a speed of the vehicle. As the vehicle speed sensor, for example, a vehicle wheel speed sensor is used, which is provided on vehicle wheels of the vehicle or on a drive shaft rotating integrally with vehicle wheels, and measures a rotational speed of the vehicle wheels. The vehicle speed sensor transmits the measured vehicle speed information (vehicle wheel speed information) to the ECU 30A. The accelerator sensor is a measuring device that measures an acceleration of the vehicle. The accelerator sensor transmits acceleration information of the vehicle to the ECU 30A.

The yaw rate sensor is a measuring device that measures a yaw rate (rotation angular velocity) around the vertical axis at the center of gravity of the vehicle. As the yaw rate sensor, for example, a Gyro sensor can be used. The yaw rate sensor transmits the measured yaw rate information of the vehicle to the ECU 30A.

The map database 4 is a database that stores map information. The map database 4 is formed, for example, in a storage device such as a hard disk drive (HDD) mounted on the vehicle. The map information includes position information, information on a shape of the road (for example, a curve, types of the straight portion, a curvature of a curve, or the like), information on positions of a merge point and a branch, and information on a position of a building. The map database 4 may be stored in a computer of a facility such as a management center capable of communicating with the vehicle.

Information on a road surface condition may be stored in the map information in advance. The information on the road surface condition includes information on the road surface irregularities (for example, steps, unevenness, the wheel track, and damage to pavement, and the like) that can become road surface disturbances which causes the reaction force of the road surface to the front wheels of the vehicle on the road surface where the vehicle travels. The information on the road surface condition may include, for example, position information on the road surface abnormality on the map and the information on the size of the road surface abnormality. The size of the road surface abnormality is a numerical value set in advance to correspond to the size of the reaction force of the road surface assumed to be applied to the front wheels of the vehicle due to the road surface abnormality. The size of the road surface abnormality may be set according to, for example, the size (for example, the amount of change in the height of the road surface), such as the level difference, unevenness, the wheel track, and damage to the pavement.

In the map database 4, for example, data of the switching location which is a location where autonomous driving terminates is stored in advance. The switching location is a location on a target route where the autonomous driving of the vehicle terminates and the driving state of the vehicle is switched from autonomous driving to the manual-driving. Examples of the switching location may be, for example, include an exit location in a freeway, a start location of traffic control due to a bad weather, and a start location of traffic control due to an accident. The data of the switching location may be stored in a database other than the map database 4. The data of the switching location may not be included in the in-vehicle database, but may be provided from a remote data server by a communication function.

The torque sensor 5 is provided on a steering shaft 22 of a steering device 20 of the vehicle, and measures the steering torque (details will be described later). The torque sensor 5 transmits the measured steering torque information to the ECU 30A. The torque sensor 5 configures a steering holding determination device 50A.

A touch sensor 6 is provided on the steering wheel, and is a sensor that detects a driver's contact with the steering wheel. For example, a capacitive type touch sensor can be used as the touch sensor 6. When the driver's hand comes in contact with the portion of the touch sensor 6 on the steering wheel 21, the touch sensor 6 transmits a contact signal to the ECU 30A. In the present embodiment, as the touch sensor 6, for example, one sensor is provided over the entire circumference of the steering wheel. The touch sensor 6 is configured to detect the contact of the driver's one hand or both hands as a common contact signal. Multiple sensors may be intermittently provided on the steering wheel as the touch sensor 6. In this case, the entire multiple touch sensor 6 may be configured so as can detect one common contact signal instead of separately detecting the driver's contact in both hand.

The HMI 8 is an interface for inputting and outputting information between the autonomous driving system 100A and the occupants (including the driver). The HMI 8 includes, for example, a display, a speaker, and the like. The HMI 8 outputs an image to the display and outputs a voice from the speaker according to a control signal from the ECU 30A. The display may be a head up display.

The actuator 9 is a device that performs a travel control of the vehicle. The actuator 9 includes at least a throttle actuator, a brake actuator, and a steering actuator. The throttle actuator controls an amount of air supplied to the engine (throttle opening degree) in accordance with the control signal from the ECU 30A, and controls the driving force of the vehicle. When the vehicle V is a hybrid vehicle, in addition to the amount of air supplied to the engine, the control signal from the ECU 30A is input to the motor as a power source to control the driving force. When the vehicle is an electric vehicle, the control signal from the ECU 30A is input to a motor as a power source to control the driving force. The motor as the power source in these cases configures the actuator 9.

The brake actuator controls the brake system according to the control signal from the ECU 30A, and controls the braking force applied to the vehicle wheels of the vehicle. For example, a hydraulic brake system can be used as the brake system. The steering actuator controls the driving of the EPS motor in an electric power steering (EPS) device according to the control signal from the ECU 30A.

Next, the steering torque measured by the steering device 20 and the torque sensor 5 of the vehicle will be described.

Figure 2:
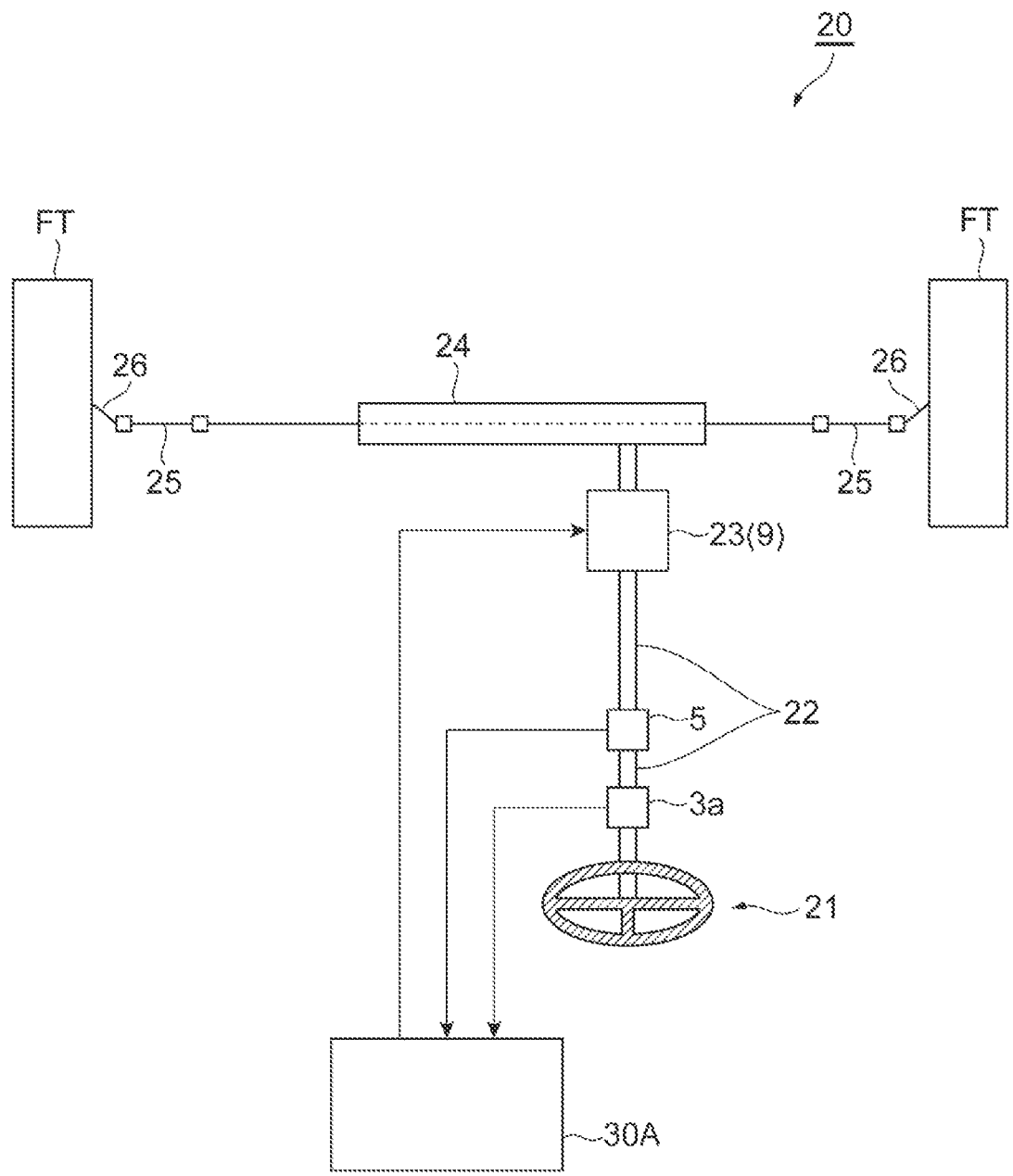
FIG. 2 is a schematic configuration diagram illustrating an example of a steering device.

FIG. 2 is a schematic diagram illustrating the configuration of the steering device 20 of the vehicle. As illustrated in FIG. 2, the steering device 20 is an electric power steering device that steers the front wheels FT in response to the operation of the steering wheel 21 or the control signal of the autonomous driving from the ECU 30A. The steering device 20 includes a steering wheel 21, a steering shaft 22, an EPS motor 23, a rack and pinion mechanism 24, tie rods 25, and knuckle arms 26.

The steering wheel 21 is connected to the rack and pinion mechanism 24 via the steering shaft 22. A steering angle sensor 3a and the torque sensor 5 are provided on the steering shaft 22. The EPS motor 23 includes, for example, an electric motor and a reduction gear, and is controlled by the ECU 30A to apply an assist torque to the steering shaft 22. The rack and pinion mechanism 24 is configured with a steering rod on which a rack is formed and a pinion rod on which a pinion is formed. In the present embodiment, the steering shaft 22 and the pinion rod of the rack and pinion mechanism 24 are physically connected to each other.

The rack and pinion mechanism 24 converts a rotational motion transmitted from the steering wheel 21 via the steering shaft 22 into a linear motion. The knuckle arms 26 are coupled to both ends of the steering rod of rack and pinion mechanism 24 via the tie rods 25.

The knuckle arms 26 are operated through the tie rod 25 by the operation of the rack and pinion mechanism 24. In this way, the front wheels FT are steered.

Here, the torque sensor 5 is provided on the middle portion of the steering shaft 22. The torque sensor 5 measures a torsion torque of the steering shaft 22 based on an amount of torsion of a torsion bar included in the steering shaft 22. The torsion torque of the steering shaft 22 is a torque that causes the steering shaft 22 to be twisted by at least one of the torque from the steering wheel 21, the torque from the rack and pinion mechanism 24, and the output torque of the EPS motor 23.

The torque from the steering wheel 21 means the torque input from the steering wheel 21 to the steering shaft 22. The torque from the steering wheel 21 includes a steering operation torque by the driver's steering operation. The steering operation torque means a torque input from the steering wheel 21 to the steering shaft 22 by a driver's operation to grip and rotate the steering wheel 21.

The torque from the rack and pinion mechanism 24 means a torque transferred from the rack and pinion mechanism 24 to the steering shaft 22. The torque from the rack and pinion mechanism 24 may include a reaction torque due to a road surface reaction force applied to the front wheels FT of the vehicle, for example, due to a road surface disturbance or the like. The output torque of the EPS motor 23 means a torque that is output by the EPS motor 23 and transferred to the steering shaft 22.

Returning to FIG. 1, the functional configurations of the ECU 30A will be described. The ECU 30A includes a vehicle position recognition unit 10, a travel state recognition unit 11, a surrounding environment recognition unit 12, a trajectory generation unit 13, a torque recognition unit 14, a contact state recognition unit 15A, a threshold value setting unit (a first threshold value setting unit) 16A, a steering holding determination unit 17, a manual-driving switching unit 18, and a vehicle control unit 19. Some of the functions of the ECU 30A described below may be performed by a computer of a facility such as a management center that can communicate with the vehicle.

The vehicle position recognition unit 10 recognizes the position of the vehicle on the map based on the position information from the GNSS receiver 1 and the map information in the map database 4. The vehicle position recognition unit 10 accurately recognizes the position of the vehicle by a simultaneous localization and mapping (SLAM) technology or the like using the position information on a target object included in the map information in the database 4 and the result of detection performed by the external sensor 2. The vehicle position recognition unit 10 may also recognize the position of the vehicle on the map by a known method.

The travel state recognition unit 11 recognizes the travel state of the vehicle based on the result of detection performed by the internal sensor 3. The travel state includes the vehicle speed of the vehicle, the acceleration of the vehicle, and the yaw rate of the vehicle.

Specifically, the travel state recognition unit 11 recognizes the vehicle speed of the vehicle based on the vehicle speed information from the vehicle speed sensor. The travel state recognition unit 11 recognizes an orientation of the vehicle based on the yaw rate information from the yaw rate sensor. The travel state recognition unit 11 recognizes the acceleration acting on the vehicle based on the acceleration information from the accelerator sensor.

The surrounding environment recognition unit 12 recognizes the surrounding environment of the vehicle based on the result of detection performed by the external sensor 2. The surrounding environment includes the state of objects around the vehicle. The surrounding environment recognition unit 12 recognizes the surrounding environment of the vehicle by a known method based on an image captured by the camera and the obstacle information from the radar sensor.

The trajectory generation unit 13 generates a trajectory to be used for the autonomous driving of the vehicle. The trajectory generation unit 13 generates the trajectory for the autonomous driving by various methods based on the destination set in advance, the map information in map database 4, the position of the vehicle on the map recognized by vehicle position recognition unit 10, the travel state of the vehicle recognized by the travel state recognition unit 11 (the vehicle speed, the yaw rate, or the like), the surrounding environment recognized by the surrounding environment recognition unit 12. The destination may be set by the occupants of the vehicle, or may be automatically proposed by the autonomous driving system 100A or a known navigation system.

The torque recognition unit 14 recognizes the steering torque based on the steering torque information from the torque sensor 5. For example, the torque recognition unit 14 recognizes the absolute value of the torsion torque of the steering shaft 22 detected by the torque sensor 5 as the steering torque. The torque recognition unit 14 may recognize the estimated torque calculated to extract the driver's steering operation torque as the steering torque by applying a low pass filter or the like to the result of detection performed by the torque sensor 5.

The contact state recognition unit 15A recognizes the presence or absence of a driver's contact with the steering wheel 21 (hereinafter, simply referred to as a "driver's contact") based on the result of detection performed by the touch sensor 6. The contact state recognition unit 15A recognizes a contact state or a non-contact state based on the contact signal from the touch sensor 6. The contact state means a state in which the driver's contact with the steering wheel 21 is detected by the touch sensor 6. The non-contact state means a state in which the driver's contact with the steering wheel 21 is not detected by the touch sensor 6. Specifically, when the driver's contact is detected by the touch sensor 6, for example, the contact state recognition unit 15A recognizes the contact state. When the driver's contact is not detected by the touch sensor 6, for example, the contact state recognition unit 15A recognizes the non-contact state.

The contact state recognition unit 15A may recognize whether the touch sensor 6 is normal or in failure. The contact state recognition unit 15A may recognize at least the contact-ON failure of the touch sensor 6 as a failure of the touch sensor 6. The contact-ON failure means that the driver's contact is erroneously detected by the touch sensor 6 even though the driver has not touched the steering wheel 21. The contact-ON failure may include a contact-ON fixed failure which means that the driver's contact is continuously detected erroneously. Whether the touch sensor 6 is normal or in failure is determined by the ECU 30A using a known method.

The contact state recognition unit 15A recognizes a contact state or a non-contact state based on, for example, the contact signal from the touch sensor 6 and the result of recognition whether the touch sensor 6 is normal or in failure. FIG. 3 is a table illustrating an example of a content of recognition performed by the contact state recognition unit 15A. In the left column of FIG. 3, the content of recognition performed by the contact state recognition unit 15A when the touch sensor 6 is normal. In the right column of FIG. 3, the content of recognition performed by the contact state recognition unit 15A when the touch sensor 6 is in failure. The content of recognition may be stored in the ECU 30A in advance as, for example, a program including a conditional expression.

The contact state recognition unit 15A may recognize the non-contact state when the touch sensor 6 is recognized as normal and when the driver's contact is not detected. The contact state recognition unit 15A may recognize the contact state when the touch sensor 6 is recognized as normal and when the driver's contact is detected.

The contact state recognition unit 15A may recognize the non-contact state when the touch sensor 6 is recognized as being in failure. The contact state recognition unit 15A may recognize the non-contact state when at least the contact-ON failure of the touch sensor 6 is recognized among the failures of the touch sensor 6.

The threshold value setting unit 16A sets a steering torque threshold value (a first threshold value) based on the result of recognition performed by the contact state recognition unit 15A, which is used for determining the steering holding state. The steering torque threshold value is a threshold value for the steering torque to be used for determining the steering holding state.

For example, the threshold value setting unit 16A sets the steering torque threshold value when the contact state recognition unit 15A recognizes the contact state, to TH1. For example, the threshold value setting unit 16A sets the steering torque threshold value when the contact state recognition unit 15A recognizes the non-contact state, to TH2. The threshold value setting unit 16A sets the steering torque threshold value to TH2 when the non-contact state is recognized by the contact state recognition unit 15A, which is a larger value compared to TH1 when the contact state is recognized by the contact state recognition unit 15A.

The threshold value setting unit 16A may set the threshold value to TH2 as a value larger than TH1 as much as a predetermined addition value $\Delta TH1$. The addition value $\Delta TH1$ is a value added to the steering torque threshold value for suppressing the erroneous determination of the steering holding state due to the above-described reaction force torque. The addition value $\Delta TH1$ can be set in advance in consideration of, for example, the magnitude of the reaction force torque that may occur due to the road surface disturbance or the like. The addition value $\Delta TH1$ may be a fixed value or a variable value.

The addition value $\Delta TH1$ may be set according to the position information on the road surface abnormality on the map and the size information on the road surface abnormality, based on the map information in the map database 4. The addition value $\Delta TH1$ may be a larger value when the size of the road surface abnormality is equal to or greater than a predetermined road surface abnormality threshold value compared to a case when the size of road surface abnormality is less than the road surface abnormality threshold value. The road surface abnormality threshold value is a threshold value of the size of the road surface abnormality for setting the addition value $\Delta TH1$ in accordance with the size of the road surface abnormality.

The steering holding determination unit 17 determines that the driver is in the steering holding state if the steering torque recognized by the torque recognition unit 14 is equal to or greater than the steering torque threshold value set by the threshold value setting unit 16A. The steering holding determination unit 17 determines that the driver is not in the steering holding state if the steering torque is less than the steering torque threshold value.

The manual-driving switching unit 18 performs the manual-driving switching control when the steering holding determination unit 17 determines that the driver is in the steering holding state during the autonomous driving. As an example, the manual-driving switching unit 18 controls the HMI 8 to notify the driver of the fact that the vehicle approaches the switching location when the vehicle in autonomous driving approaches the switching location which is a location where the autonomous driving terminates. The manual-driving switching unit 18 performs the manual-driving switching control to switch the driving mode from the autonomous driving to the manual-driving when the HMI 8 is controlled to perform the notification on the driver and if the steering holding determination unit 17 determines that the driver is in the steering holding state by the driver's steering operation in response to the notification of approach.

The manual-driving switching unit 18 does not perform the manual-driving switching control when the steering holding determination unit 17 determines that the driver is not in the steering holding state. For example, when the steering holding determination unit 17 does not determine that the driver is in the steering holding state and when the vehicle in the autonomous driving reaches the switching location, the manual-driving switching unit 18 may switch from the autonomous driving to the manual-driving by a predetermined control other than the manual-driving switching control.

The vehicle control unit 19 performs the autonomous driving of the vehicle based on the position of the vehicle on the map recognized by the vehicle position recognition unit 10, the travel state of the recognized by the travel state recognition unit 11, the surrounding environment recognized by the surrounding environment recognition unit 12, and the trajectory generated by the trajectory generation unit 13. The vehicle control unit 19 performs the autonomous driving by making the vehicle travel along the trajectory. The vehicle control unit 19 performs the autonomous driving using a known method.

Example of Operation Processing by ECU 30A

Figure 4:
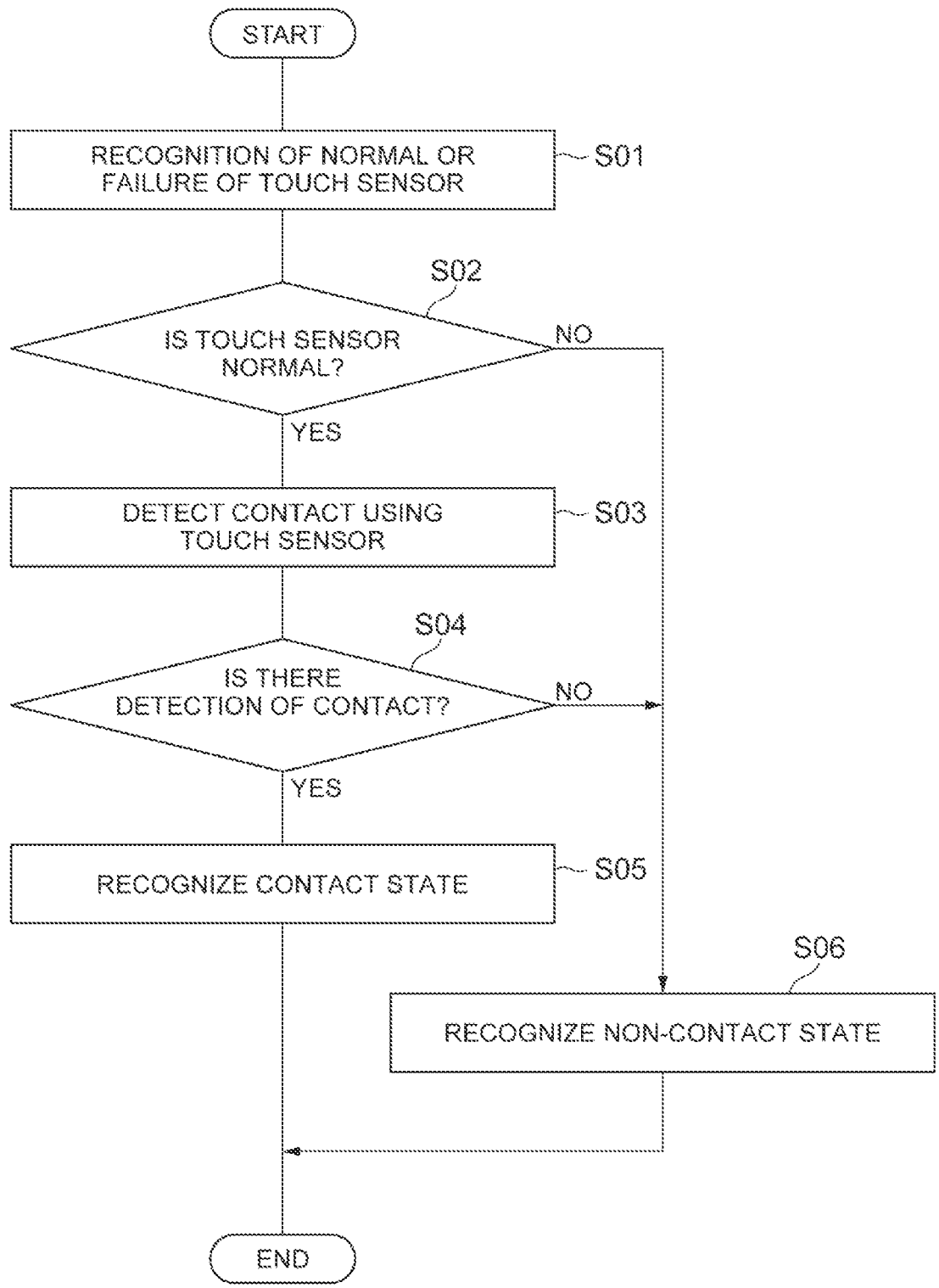
FIG. 4 is a flowchart of contact state recognition processing by the steering holding determination device in FIG. 1.

Next, examples of operation processing by the steering holding determination device 50A and the autonomous driving system 100A will be described. FIG. 4 is a flowchart of the contact state recognition processing by the steering holding determination device 50A. The processing in the flowchart illustrated in FIG. 4 is repeatedly executed, for example, at a predetermined operation cycle during the autonomous driving of the vehicle.

In S01, the ECU 30A of the steering holding determination device 50A recognizes whether the touch sensor 6 is normal or in failure using the contact state recognition unit 15A. The contact state recognition unit 15A recognizes whether the touch sensor 6 is normal or in failure based on the result of determination performed by the ECU 30A whether the touch sensor 6 is normal or in failure.

In S02, the ECU 30A determines whether or not the contact state recognition unit 15A recognizes that the touch sensor 6 is normal. When it is recognized by the contact state recognition unit 15A that the touch sensor 6 is normal (YES in S02), the ECU 30A detects the driver's contact using the touch sensor 6 in S03. When the driver comes in contact with the touch sensor 6, the touch sensor 6 transmits the contact signal to the ECU 30A.

In S04, the ECU 30A determines whether or not the driver's contact is detected by the touch sensor 6 using the contact state recognition unit 15A. When it is recognized by the contact state recognition unit 15A that the contact is detected by the touch sensor 6 (YES in S04), the ECU 30A recognizes the contact state using the contact state recognition unit 15A in S05. Thereafter, the ECU 30A ends the operation processing in FIG. 4.

On the other hand, when it is recognized by the contact state recognition unit 15A that the contact is not detected by the touch sensor 6 (NO in S04), the ECU 30A recognizes the non-contact state using the contact state recognition unit 15A in S06. Thereafter, the ECU 30A ends the operation processing in FIG. 4.

On the other hand, when it is recognized by the contact state recognition unit 15A that the touch sensor 6 is in failure (NO in S02), the ECU 30A recognizes the non-contact state using the contact state recognition unit 15A in S06. Thereafter, the ECU 30A ends the operation processing in FIG. 4.

Figure 5:
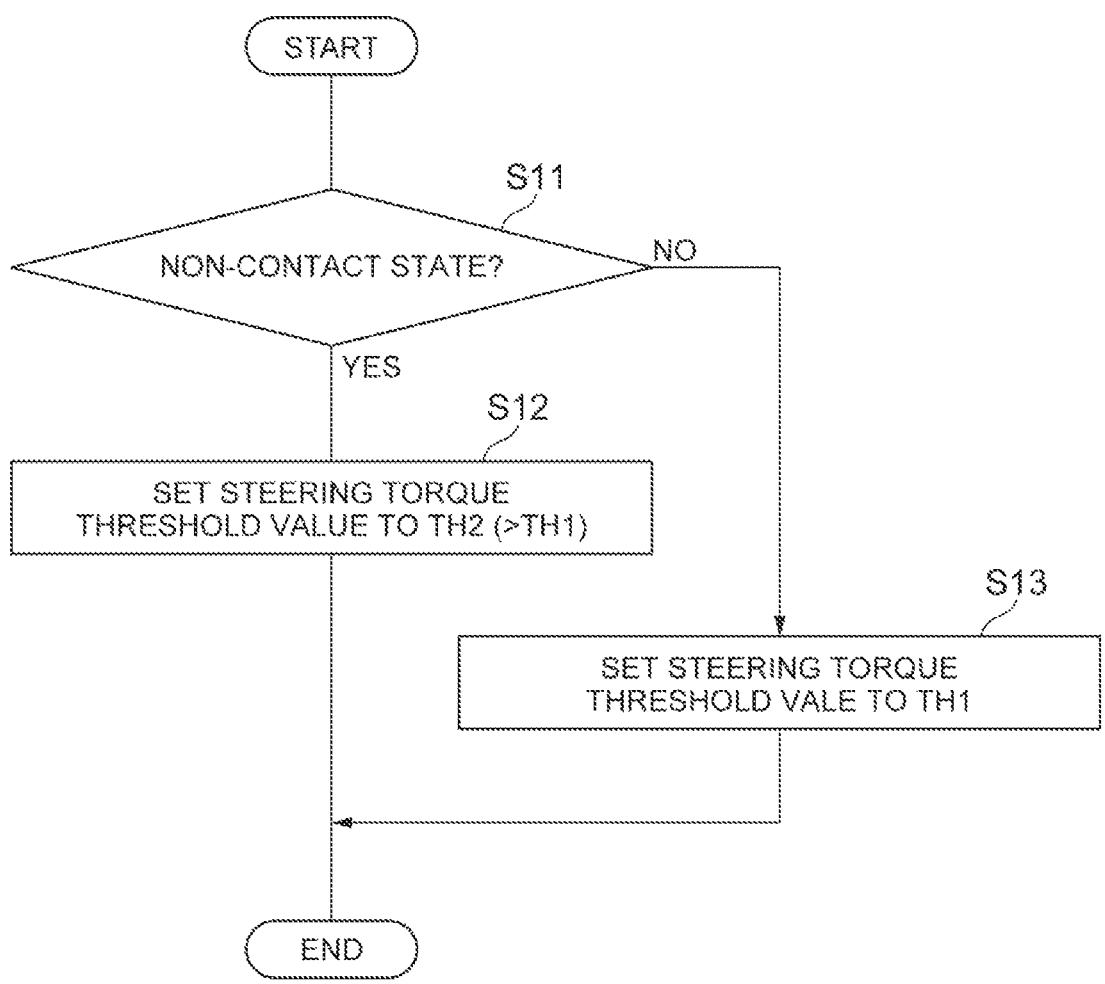
FIG. 5 is a flowchart of threshold value setting processing by the steering holding determination device in FIG. 1.

FIG. 5 is a flowchart of threshold value setting processing by the steering holding determination device 50A. The processing in the flowchart illustrated in FIG. 5 is repeatedly executed, for example, at a predetermined operation cycle during the autonomous driving of the vehicle.

In S1 1, the ECU 30A determines whether the result of recognition performed by the contact state recognition unit 15A is the non-contact state or not using the threshold value setting unit 16A. When it is determined that the result of recognition performed by the contact state recognition unit 15A is the non-contact state (YES in S11), the ECU 30A sets the steering torque threshold value to the threshold value TH2 using the threshold value setting unit 16A in S12. Thereafter, the ECU 30A ends the operation processing in FIG. 5.

On the other hand, when it is determined that the result of recognition performed by the contact state recognition unit 15A is the contact state (NO in S11), the ECU 30A sets the steering torque threshold value to the threshold value TH1 using the threshold value setting unit 16A in S13. Thereafter, the ECU 30A ends the operation processing in FIG. 5.

Figure 6:
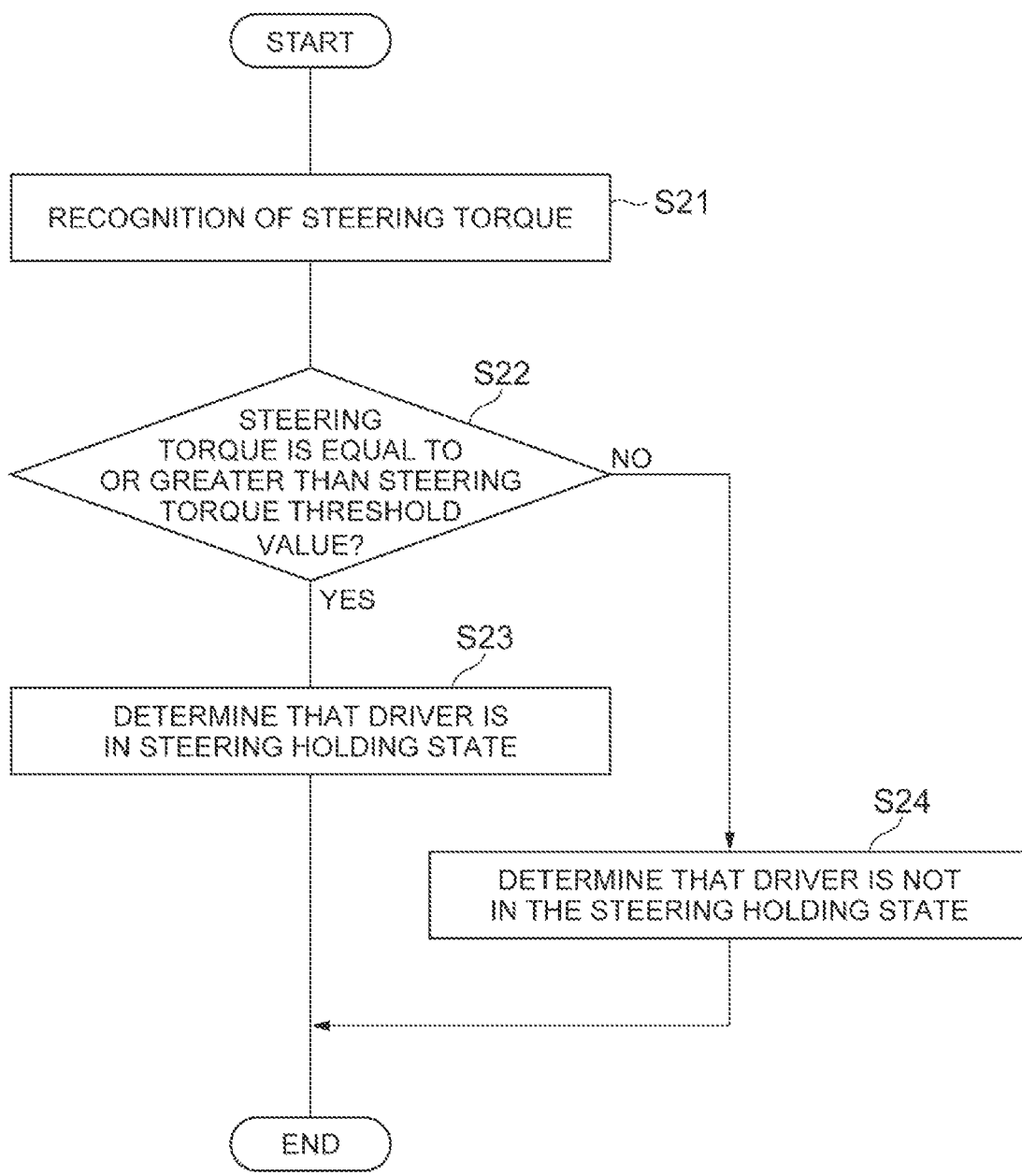
FIG. 6 is a flowchart illustrating steering holding state determination processing.

FIG. 6 is a flowchart illustrating steering holding state determination processing. The processing in the flowchart illustrated in FIG. 6 is repeatedly executed, for example, at a predetermined operation cycle during the autonomous driving of the vehicle.

In S21, the ECU 30A recognizes the steering torque using the torque recognition unit 14. The torque recognition unit 14 recognizes the steering torque based on the result of detection performed by the torque sensor 5.

In S22, the ECU 30A determines whether or not the steering torque is equal to or greater than the steering torque threshold value using the steering holding determination unit 17. When it is determined by the steering holding determination unit 17 that the steering torque is equal to or greater than the steering torque threshold value (YES in S22), the ECU 30A determines that the driver is in the steering holding state using the steering holding determination unit 17 in S23. When the steering torque recognized by the torque recognition unit 14 becomes equal to or greater than the steering torque threshold value set by the threshold value setting unit 16A, the steering holding determination unit 17 determines that the driver is in the steering holding state. On the other hand, when the steering holding determination unit 17 determines that the steering torque is less than the steering torque threshold value (NO in S22), the ECU 30A determines that the driver is not in the steering holding state using the steering holding determination unit 17 in S24. The steering holding determination unit 17 determines that the driver is not in the steering holding state when the steering torque is less than the steering torque threshold value. Thereafter, the ECU 30A ends the operation processing in FIG. 6.

Figure 7:
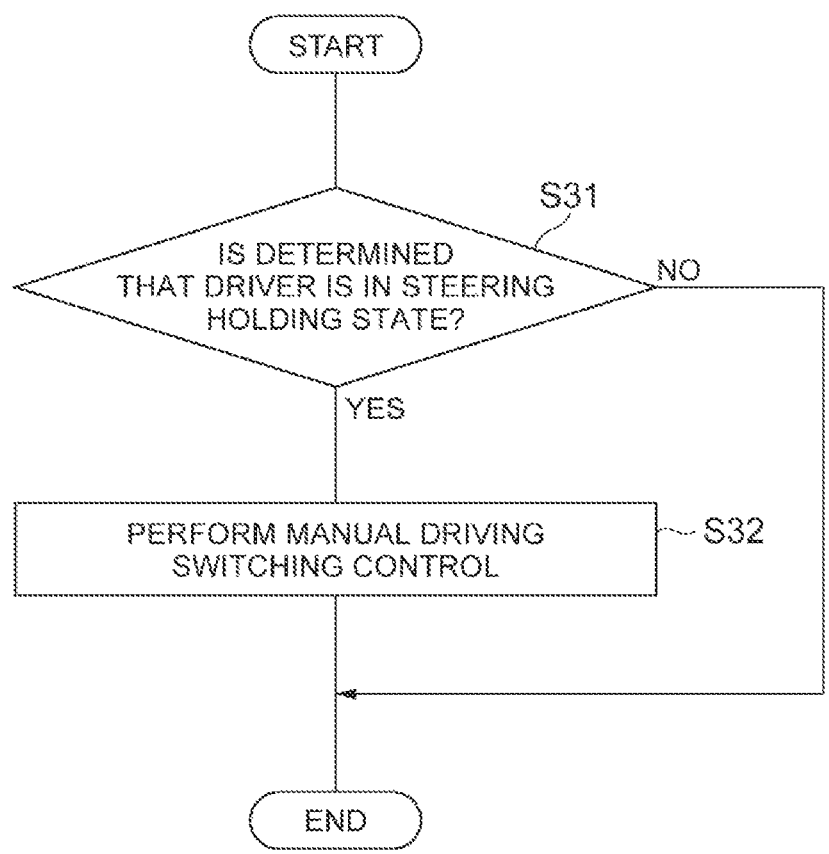
FIG. 7 is a flowchart illustrating manual-driving switching determination processing.

FIG. 7 is a flowchart illustrating manual-driving switching determination processing. For example, when the vehicle in autonomous driving is approaching the switching location, the processing in the flowchart illustrated in FIG. 7 is repeatedly performed for each predetermined operation cycle together with notification processing that notifies the driver of the fact that the vehicle approaches the switching location.

In S31, the ECU 30A determines whether or not the steering holding determination unit 17 determines that the driver is in the steering holding state using the manual-driving switching unit 18. When it is determined that the driver is in the steering holding state by the steering holding determination unit 17 (YES in S31), the manual-driving switching unit 18 performs the manual-driving switching control in S32. On the other hand, when it is determined that the driver is not in the steering holding state by the steering holding determination unit 17 (NO in S31), the ECU 30A does not perform the manual-driving switching control using the manual-driving switching unit 18, and ends the operation processing of FIG. 7.

As described above, according to the steering holding determination device 50A, when the driver's contact is not detected by the touch sensor 6, since the steering torque threshold value is set to a larger value compared to the case when the driver's contact is detected, it becomes difficult for the steering holding determination unit 17 to determine that the driver is in the steering holding state. Accordingly, it is possible to suppress the erroneous determination of the steering holding state even though the driver does not intend to hold the steering wheel in such a case where there is a torque input to the steering shaft 22 caused by the road surface disturbance or the like when the driver's hand is away from the steering wheel 21. As a result, it is possible to appropriately determine the driver's steering holding state based on the steering torque.

The contact state recognition unit 15A recognizes whether the touch sensor 6 is normal or in failure and if the touch sensor 6 is recognized as being in failure, the steering holding determination device 50A recognizes the non-contact state. In this way, for example, even in the case of contact-ON failure of touch sensor 6 where the driver's contact is erroneously detected by touch sensor 6, since the state is regarded as a non-contact state, the steering torque threshold value is set to a larger value compared to a case when the touch sensor 6 detects driver's contact when the touch sensor 6 is normal. As a result thereof, for example, even in a case of contact-ON failure of the touch sensor 6, it is possible to suppress the inappropriate determination of the driver's steering holding state.

The autonomous driving system 100A includes the steering holding determination device 50A described above and the manual-driving switching unit 18 that performs the manual-driving switching control when the steering holding determination unit 17 of the steering holding determination device 50A determines that the driver is in the steering holding state during the autonomous driving. In this way, it possible to realize the appropriate switching of the driving mode to the manual-driving based on the result of determination of the driver's steering holding state appropriately determined based on the steering torque.

Second Embodiment

A steering holding determination device and an autonomous driving system according to a second embodiment will be described. FIG. 8 is a block diagram illustrating an autonomous driving system 100B including a steering holding determination device 50B according to the second embodiment. As illustrated in FIG. 8, the steering holding determination device 50B and the autonomous driving system 100B includes an ECU 30B instead of the ECU 30A and the touch sensor 6 is configured to include a right touch sensor 6a and the left touch sensor 6b, and those are points different from the steering holding determination device 50A and the autonomous driving system 100A. In other points, the steering holding determination device 50B and the autonomous driving system 100B are configured in the same manner as the steering holding determination device 50A and the autonomous driving system 100A.

Configuration of Steering Holding Determination Device 50B and Autonomous Driving System 100B The right touch sensor 6a and the left touch sensor 6b are sensors provided in the steering wheel 21 and detect the driver's contact with the steering wheel.

The right touch sensor 6a is provided, for example, on the right hand side of the driver toward the steering wheel 21 in the straight traveling state of the vehicle. In the present embodiment, as the right touch sensor 6a, for example, one sensor is provided over the half circumference of the steering wheel on the right hand side of the driver. When the driver's hand comes in contact with the right touch sensor 6a portion of the steering wheel 21, the right touch sensor 6a transmits a contact signal to the ECU 30B independently of the left touch sensor 6b.

The left touch sensor 6b is provided, for example, on the left hand side of the driver toward the steering wheel 21 in the straight traveling state of the vehicle. In the present embodiment, as the left touch sensor 6b, for example, one sensor is provided over the half circumference of the steering wheel on the left hand side of the driver. When the driver's hand comes in contact with the left touch sensor 6b portion of the steering wheel 21, the left touch sensor 6b transmits the contact signal to the ECU 30B independently of the right touch sensor 6a.

As illustrated in FIG. 8, the ECU 30B includes a contact state recognition unit 15B and a threshold value setting unit (a first threshold value setting unit) 16B as functional configurations different from the contact state recognition unit 15A and the threshold value setting unit 16A of the ECU 30A.

The contact state recognition unit 15B recognizes the presence or absence of the driver's contact based on the results of detection performed by the right touch sensor 6a and the left touch sensor 6b. The contact state recognition unit 15B recognizes the contact state based on the contact signals from the right touch sensor 6a and the left touch sensor 6b while dividing the contact state into a two-hand contact state and a one-hand contact state. The two-hand contact state means a state in which the driver's contact with the steering wheel 21 is detected by the right touch sensor 6a and the left touch sensor 6b. The one-hand contact state means that the driver's contact with the steering wheel 21 is detected by the right touch sensor 6a or the left touch sensor 6b.

Specifically, the contact state recognition unit 15B recognizes the two-hand contact state, for example, when the driver's contact is detected in both the right touch sensor 6a and the left touch sensor 6b. The contact state recognition unit 15B recognizes the one-hand contact state, for example, when the driver's contact is detected in any one of the right touch sensor 6a and the left touch sensor 6b. The contact state recognition unit 15B recognizes the non-contact state, for example, when the driver's contact is not detected in both the right touch sensor 6a and the left touch sensor 6b.

The contact state recognition unit 15B may recognize whether each of the right touch sensor 6a and the left touch sensor 6b is normal or in failure. The contact state recognition unit 15B may recognize at least the contact-ON failure of the right touch sensor 6a as a failure of the right touch sensor 6a. The contact state recognition unit 15B may recognize at least the contact-ON failure of the left touch sensor 6b as a failure of the left touch sensor 6b.

The contact state recognition unit 15B recognizes the two-hand contact state, the one-hand contact state, or the non-contact state based on, for example, the contact signals from the right touch sensor 6a and the left touch sensor 6b, and the result of recognition of whether the right touch sensor 6a and the left touch sensor 6b are normal or in failure. FIG. 9 is a table illustrating an example of a content of recognition performed by the contact state recognition unit 15B. The center column in FIG. 9 illustrates a content of recognition performed by the contact state recognition unit 15B when the right touch sensor 6a is normal. The right column in FIG. 9 illustrates a content of recognition performed by the contact state recognition unit 15B when the right touch sensor 6a is in failure. The center row in FIG. 9 illustrates a content of recognition performed by the contact state recognition unit 15B when the left touch sensor 6b is normal. The lower row in FIG. 9 illustrates a content of recognition performed by the contact state recognition unit 15B when the left touch sensor 6b is in failure. The content of recognition may be stored in the ECU 30B in advance as, for example, a program including a conditional expression.

If it is recognized that both the touch sensors 6a and 6b are normal and when the driver's contact is not detected by both the touch sensors 6a and 6b, the contact state recognition unit 15B may recognize the non-contact state. If it is recognized that both the touch sensors 6a and 6b are normal and when the driver's contact is detected by the touch sensors 6a or the left touch sensor 6b, the contact state recognition unit 15B may recognize the one-hand contact state. If it is recognized that both the touch sensors 6a and 6b are normal and when the driver's contact is detected by both the touch sensors 6a and 6b, the contact state recognition unit 15B may recognize the two-hand contact state.

If it is recognized that any one of the right touch sensor 6a and the left touch sensor 6b is normal and the other is in failure, and when the driver's contact is not detected by the right touch sensor 6a or the left touch sensor 6b which were recognized as normal, the contact state recognition unit 15B may recognize the non-contact state. If it is recognized that any one of the right touch sensor 6a and the left touch sensor 6b is normal and the other is in failure, and when the driver's contact is detected by the right touch sensor 6a or the left touch sensor 6b which were recognized as normal, the contact state recognition unit 15B may recognize the two-hand contact state.

If it is recognized that both the right touch sensor 6a and the left touch sensor 6b are in failure, the contact state recognition unit 15B may recognize the non-contact state. If it is recognized that the contact-ON failure is recognized for a failure of either one of the right touch sensor 6a and the left touch sensor 6b, the contact state recognition unit 15B may recognize the non-contact state.

The threshold value setting unit 16B sets a steering torque threshold value (a first threshold value) based on the result of recognition performed by the contact state recognition unit 15B. If the non-contact state is recognized by the contact state recognition unit 15B, the threshold value setting unit 16B sets the steering torque threshold value to a larger value compared to the case when the one-hand contact state or the two-hand contact state (the contact state) is recognized by the contact state recognition unit 15B.

For example, the threshold value setting unit 16B sets the steering torque threshold value when the two-hand contact state is recognized by the contact state recognition unit 15B, to TH3. For example, the threshold value setting unit 16B sets the steering torque threshold value when the one-hand contact state is recognized by the contact state recognition unit 15B, to TH4. For example, the threshold value setting unit 16B sets the steering torque threshold value when the non-contact state is recognized by the contact state recognition unit 15B, to TH5. The threshold value setting unit 16B sets steering torque threshold value to TH4 when the one-hand contact state is recognized by the contact state recognition unit 15B, which is a larger value compared to TH3 when the two-hand contact state is recognized by the contact state recognition unit 15b. The threshold value setting unit 16B sets steering torque threshold value to TH5 when the non-contact state is recognized by the contact state recognition unit 15B, which is a larger value compared to TH4 when the one-hand contact state is recognized by the contact state recognition unit 15b.

The threshold value setting unit 16B may set the threshold value to TH4 which is larger than TH3 as much as a predetermined addition value $\Delta TH2$. The threshold value setting unit 16B may set the threshold value to TH5 which larger than TH4 as much as a predetermined addition value $\Delta TH3$. The addition values $\Delta TH2$ and $\Delta TH3$ may be set in the same manner as the addition value $\Delta TH$. The sum of the addition values $\Delta TH2$ and $\Delta TH3$ may be the value same as the addition value $\Delta TH1$ or may be a different value. For example, the addition value $\Delta TH3$ may be the value same as the addition value $\Delta TH2$ or may be a value larger than the addition value $\Delta TH2$.

Example of Operation Processing by ECU 30B

With regard to an example of operation processing by the steering holding determination device 50B and the autonomous driving system 100B, the contact state recognition processing and the threshold value setting processing which are different from the processing by the steering holding determination device 50A and the autonomous driving system 100A will be described using the FIG. 10 to FIG. 14. The steering holding state determination processing and the and the manual-driving switching determination processing by the steering holding determination device 50B and the autonomous driving system 100B are respectively the same as the processing in FIG. 6 and FIG. 7, and thus, the description thereof will be not be repeated.

Figure 10:
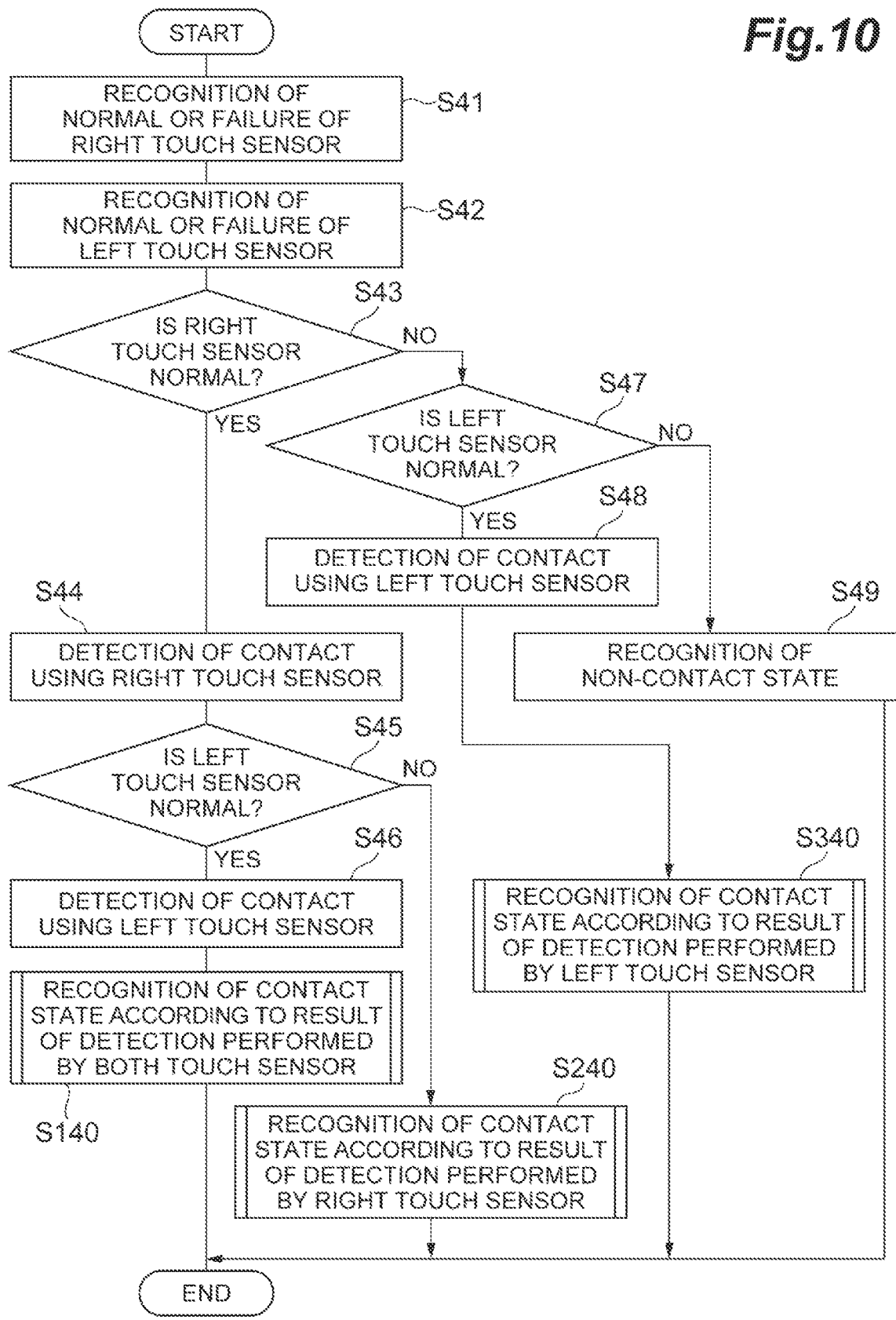
FIG. 10 is a flowchart of contact state recognition processing by the steering holding determination device in FIG. 8.
Figure 11:
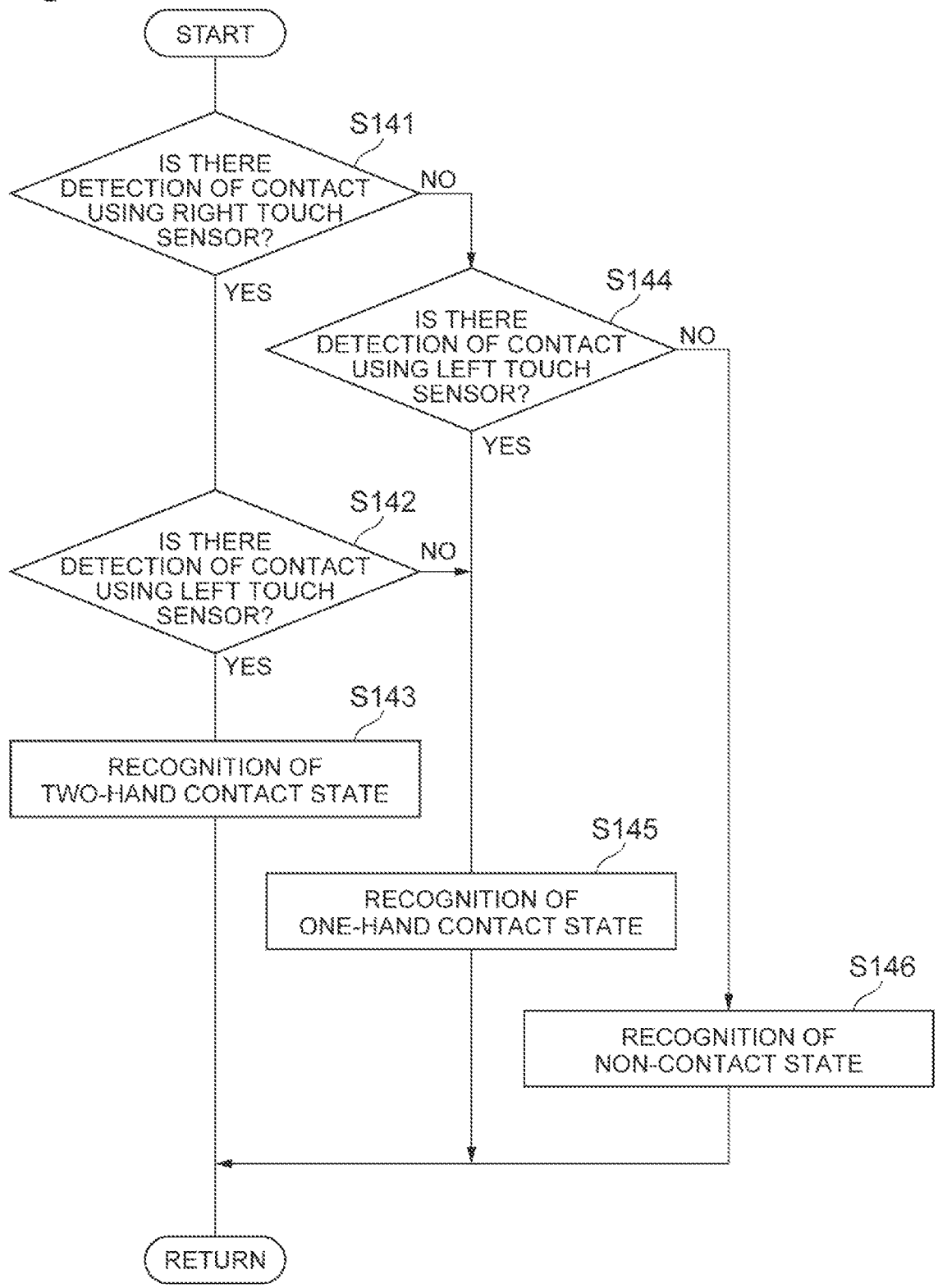
FIG. 11 is a flowchart specifically illustrating the processing in S140 in FIG. 10.
Figure 12:
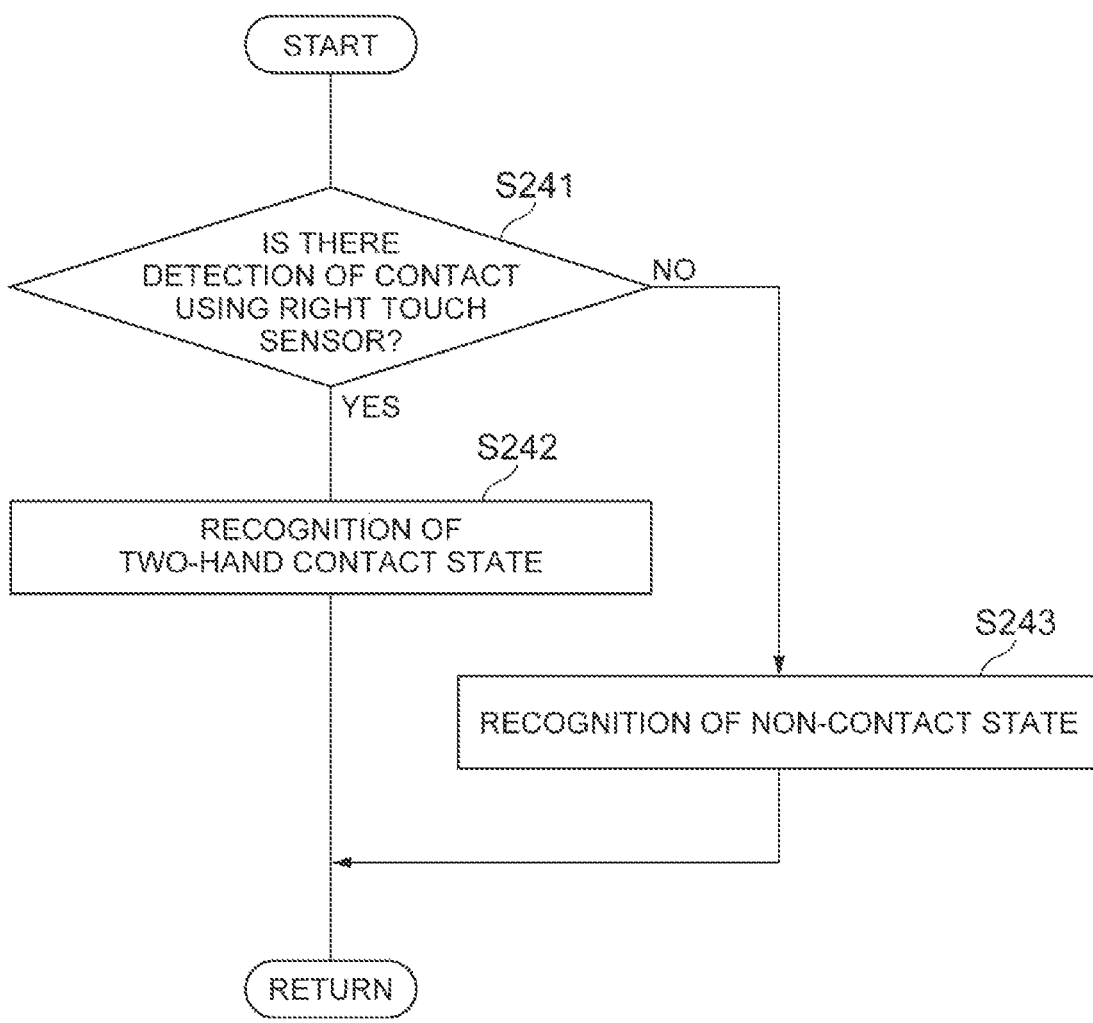
FIG. 12 is a flowchart specifically illustrating the processing in S240 in FIG. 10.
Figure 13:
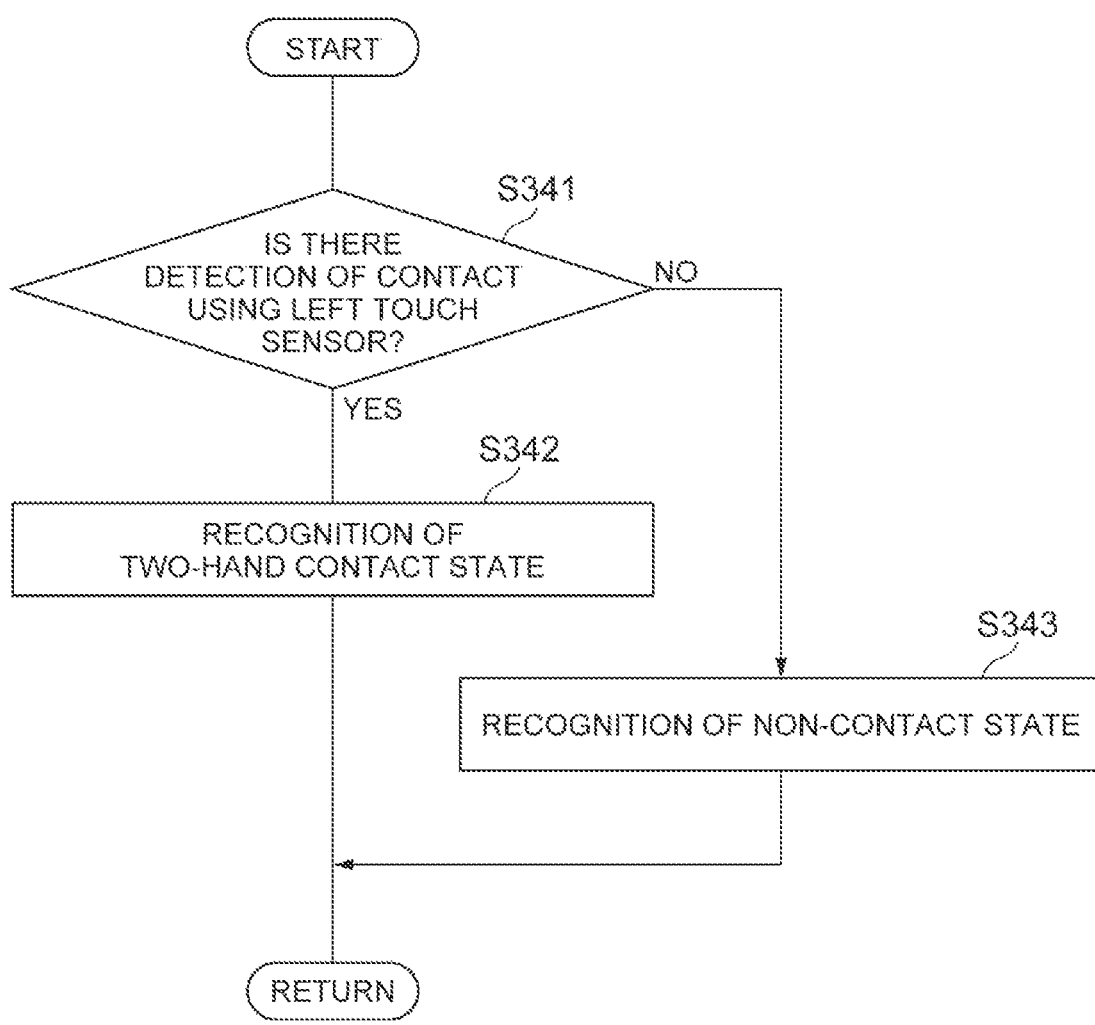
FIG. 13 is a flowchart specifically illustrating the processing in S340 in FIG. 10.

FIG. 10 is a flowchart of the contact state recognition processing by the steering holding determination device 50B. FIG. 11 is a flowchart specifically illustrating the processing in S140 in FIG. 10. FIG. 12 is a flowchart specifically illustrating the processing in S240 in FIG. 10. FIG. 13 is a flowchart specifically illustrating the processing in S340 in FIG. 10. The processing in the flowcharts illustrated in FIG. 10 to FIG. 13 are repeatedly performed, for example, at predetermined operation cycles during the autonomous driving of the vehicle.

In S41, the ECU 30B of the steering holding determination device 50B recognizes whether the right touch sensor 6a is normal or in failure using the contact state recognition unit 15B. The contact state recognition unit 15B recognizes whether the right touch sensor 6a is normal or in failure based on the result of determination performed by the ECU 30B whether the right touch sensor 6a is normal or in failure.

In S42, the ECU 30B recognizes whether the left touch sensor 6b is normal or in failure using the contact state recognition unit 15B. The contact state recognition unit 15B recognizes whether the left touch sensor 6b is normal or in failure based on the result of determination performed by the ECU 30B whether the left touch sensor 6b is normal or in failure.

In S43, the ECU 30B determines whether or not the contact state recognition unit 15B recognizes that the right touch sensor 6a is normal. When it is recognized by the contact state recognition unit 15B that the right touch sensor 6a is normal (YES in S43), the ECU 30B detects the driver's contact using the right touch sensor 6a in S44. When the driver comes in contact with the right touch sensor 6a, the right touch sensor 6a transmits the contact signal to the ECU 30B.

In S45, the ECU 30B determines whether the left touch sensor 6b is recognized as normal using the contact state recognition unit 15B. When it is recognized by the contact state recognition unit 15B that the left touch sensor 6b is normal (YES in S45), the ECU 30B detects the driver's contact using the left touch sensor 6b in S46. When the driver comes in contact with the left touch sensor 6b, the left touch sensor 6b transmits a contact signal to the ECU 30B.

In S140, the ECU 30B recognizes the contact state according to the result of detection performed by both the touch sensors 6a and 6b using the contact state recognition unit 15B. Specifically, as illustrated in FIG. 11, in S141, the ECU 30B determines whether or not the driver's contact is detected by the right touch sensor 6a using the contact state recognition unit 15B. When it is recognized by the contact state recognition unit 15B that the driver's contact is detected by the right touch sensor 6a (YES in S141), in S142, the ECU 30B determines whether or not the driver's contact is detected by the left touch sensor 6b using the contact state recognition unit 15B. When it is recognized by the contact state recognition unit 15B that the driver's contact is detected by the left touch sensor 6b (YES in S142), the ECU 30B recognizes the two-hand contact state in S143. Alternatively, when it is recognized by the contact state recognition unit 15B that the driver's contact is not detected by the left touch sensor 6b (NO in S142), the ECU 30B recognizes the one-hand contact state in S145. Thereafter, the ECU 30B ends the operation processing in FIG. 10 and FIG. 11.

On the other hand, when it is recognized by the contact state recognition unit 15B that the right touch sensor 6a is in failure (NO in S141), in S144, the ECU 30B determines whether or not the driver's contact is detected by the left touch sensor 6b using the contact state recognition unit 15B. When it is recognized by the contact state recognition unit 15B that the driver's contact is detected by the left touch sensor 6b (YES in S144), the ECU 30B recognizes the one-hand contact state in S145. Alternatively, when it is recognized by the contact state recognition unit 15B that the driver's contact is not detected by the left touch sensor 6b (NO in S144), the ECU 30B recognizes the non-contact state in S146. Thereafter, the ECU 30BA ends the operation processing in FIG. 10 and FIG. 11.

Returning to FIG. 10, when it is recognized by the contact state recognition unit 15B that the left touch sensor 6b is in failure (NO in S45), in S240, the ECU 30B recognizes the contact state according to the result of detection performed by the right touch sensor 6a using the contact state recognition unit 15B. Specifically, as illustrated in FIG. 12, in S241, the ECU 30B determines whether or not the driver's contact is detected by the right touch sensor 6a using the contact state recognition unit 15B. When it is recognized by the contact state recognition unit 15B that the driver's contact is detected by the right touch sensor 6a (YES in S241), the ECU 30B recognizes the two-hand contact state in S242. When it is recognized by the contact state recognition unit 15B that the driver's contact is not detected by the right touch sensor 6a (NO in S241), the ECU 30B recognizes the non-contact state in S243. Thereafter, the ECU 30B ends the operation processing in FIG. 10 and FIG. 12.

Returning to FIG. 10, when it is recognized by the contact state recognition unit 15B that the right touch sensor 6a is in failure (NO in S43), in S47, the ECU 30B determines whether or not the left touch sensor 6b is normal using the contact state recognition unit 15B.

When it is recognized by the contact state recognition unit 15B that the left touch sensor 6b is normal (YES in S47), in S48, the ECU 30B detects the driver's contact to the left touch sensor 6b using the contact state recognition unit 15B. When the driver comes in contact with the left touch sensor 6b, the left touch sensor 6b transmits the contact signal to the ECU 30B. In S340, the ECU 30B recognizes the contact state according to the result of detection performed by the left touch sensor 6b using the contact state recognition unit 15B. Specifically, as illustrated in FIG. 13, in S341, the ECU 30B determines whether or not the driver's contact is detected by the left touch sensor 6b using the contact state recognition unit 15B. When it is recognized by the contact state recognition unit 15B that the driver's contact is detected by the left touch sensor 6b (YES in S341), the ECU 30B recognizes the two-hand contact state in S342. Alternatively, when it is recognized by the contact state recognition unit 15B that the driver's contact is not detected by the left touch sensor 6b (NO in S341), the ECU 30B recognizes the non-contact state in S343. Thereafter, the ECU 30B ends the operation processing in FIG. 10 and FIG. 13.

Returning to FIG. 10, when it is recognized by the contact state recognition unit 15B that the left touch sensor 6b is in failure (NO in S47), the ECU 30B recognizes the non-contact state using the contact state recognition unit 15B in S49. Thereafter, the ECU 30B ends the operation processing in FIG. 10.

Figure 14:
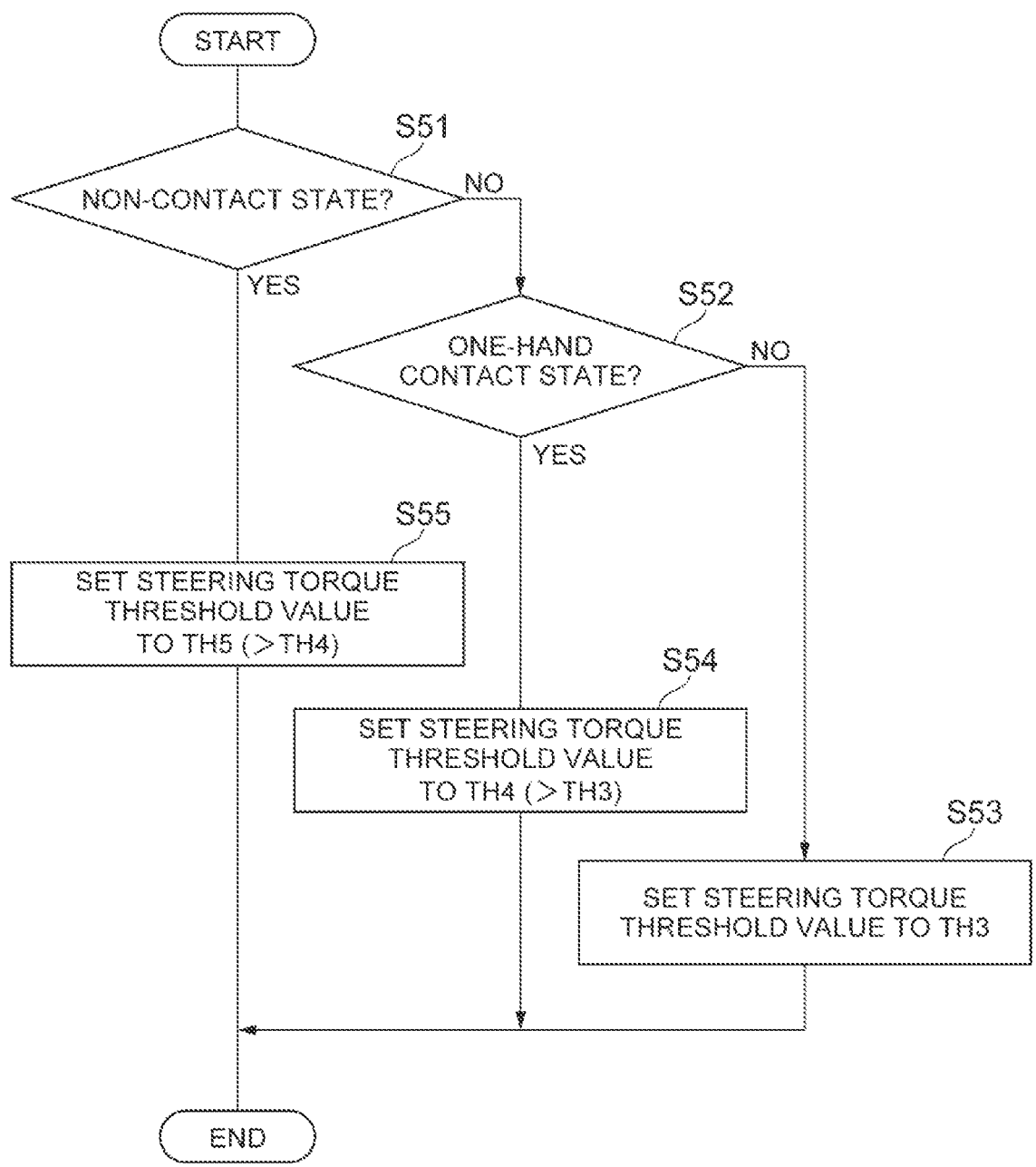
FIG. 14 is a flowchart of threshold value setting processing by the steering holding determination device in FIG. 8.

FIG. 14 is a flowchart of threshold value setting processing by the steering holding determination device 50B. The processing in the flowchart illustrated in FIG. 14 is repeatedly performed, for example, at a predetermined operation cycle during the autonomous driving of the vehicle.

In S51, the ECU 30B determines whether or not the result of recognition performed by the contact state recognition unit 15B is a non-contact state using the threshold value setting unit 16B. When it is determined that the result of recognition performed by the contact state recognition unit 15B is not the non-contact state (NO in S51), in S52, the ECU 30B determines whether or not the result of recognition performed by the contact state recognition unit 15B is the one-hand contact state using the threshold value setting unit 16B. When it is determined that the result of recognition performed by the contact state recognition unit 15B is not the one-hand contact state (NO in S52), in S53, the threshold value setting unit 16B sets the steering torque threshold value to the threshold value TH3. Thereafter, the ECU 30B ends the operation processing in FIG. 14.

On the other hand, when it is determined that the result of recognition performed by the contact state recognition unit 15B is the one-hand contact state (YES in S52), in S54, the ECU 30B sets the steering torque threshold value to the threshold value TH4 using the threshold value setting unit 16B. Thereafter, the ECU 30B ends the operation processing in FIG. 14.

On the other hand, when it is determined that the result of recognition performed by the contact state recognition unit 15B is the non-contact state (YES in S51), in S55, the ECU 30B sets the steering torque threshold value to the threshold value TH5 using the threshold value setting unit 16B. Thereafter, the ECU 30B ends the operation processing in FIG. 14.

As described above, in the steering holding determination device 50B, the touch sensor 6 includes the right touch sensor 6a and the left touch sensor 6b. The contact state recognition unit 15B recognizes the contact state based on the results of detection performed by the right touch sensor 6a and the left touch sensor 6b, while dividing the contact state into two-hand contact state which is detected by the right touch sensor 6a and the left touch sensor 6b, and the one-hand contact which is detected by the right touch sensor 6a or the left touch sensor 6b. When the one-hand contact state is recognized by the contact state recognition unit 15B, the threshold value setting unit 16B sets the steering torque threshold value to a larger value compared to the case when the two-hand contact state is recognized by the contact state recognition unit 15B. In this way, it is possible to appropriately set the steering torque threshold value using the right touch sensor 6a and the left touch sensor 6b.

In the steering holding determination device 50B, the contact state recognition unit 15B recognizes whether the right touch sensor 6a and the left touch sensor 6b are normal or in failure, respectively. If it is recognized that any one of the right touch sensor 6a and the left touch sensor 6b is normal and the other is in failure, and when the contact is detected by the right touch sensor 6a or the left touch sensor 6b which were recognized as normal, the contact state recognition unit 15B recognizes the two-hand contact state. In this case, since the contact is detected by the right touch sensor 6a or the left touch sensor 6b which is recognized as normal, there is a possibility that the driver may have an intention to hold the steering wheel. Therefore, the state is regarded as a two-hand contact state, and thus, the steering torque threshold value is set as a value when the driver's contact is detected by the right touch sensor 6a and the left touch sensor 6b when right touch sensor 6a and left touch sensor 6b are normal. As a result, it becomes easier for the steering holding determination unit 17 to determine that the driver is in the steering holding state. As a result thereof, it is possible to appropriately set the steering torque threshold value in response to the possibility of the driver's intention to hold the steering wheel.

The autonomous driving system 100B includes the above-described steering holding determination device 50B, and the manual-driving switching unit 18 that performs the manual-driving switching control when the steering holding determination unit 17 of the steering holding determination device 50B determines that the driver is in the steering holding state during the autonomous driving. In this way, it possible to realize the appropriate switching of the driving mode to the manual-driving based on the result of determination of the driver's steering holding state appropriately determined based on the steering torque.

Third Embodiment

Figure 15:
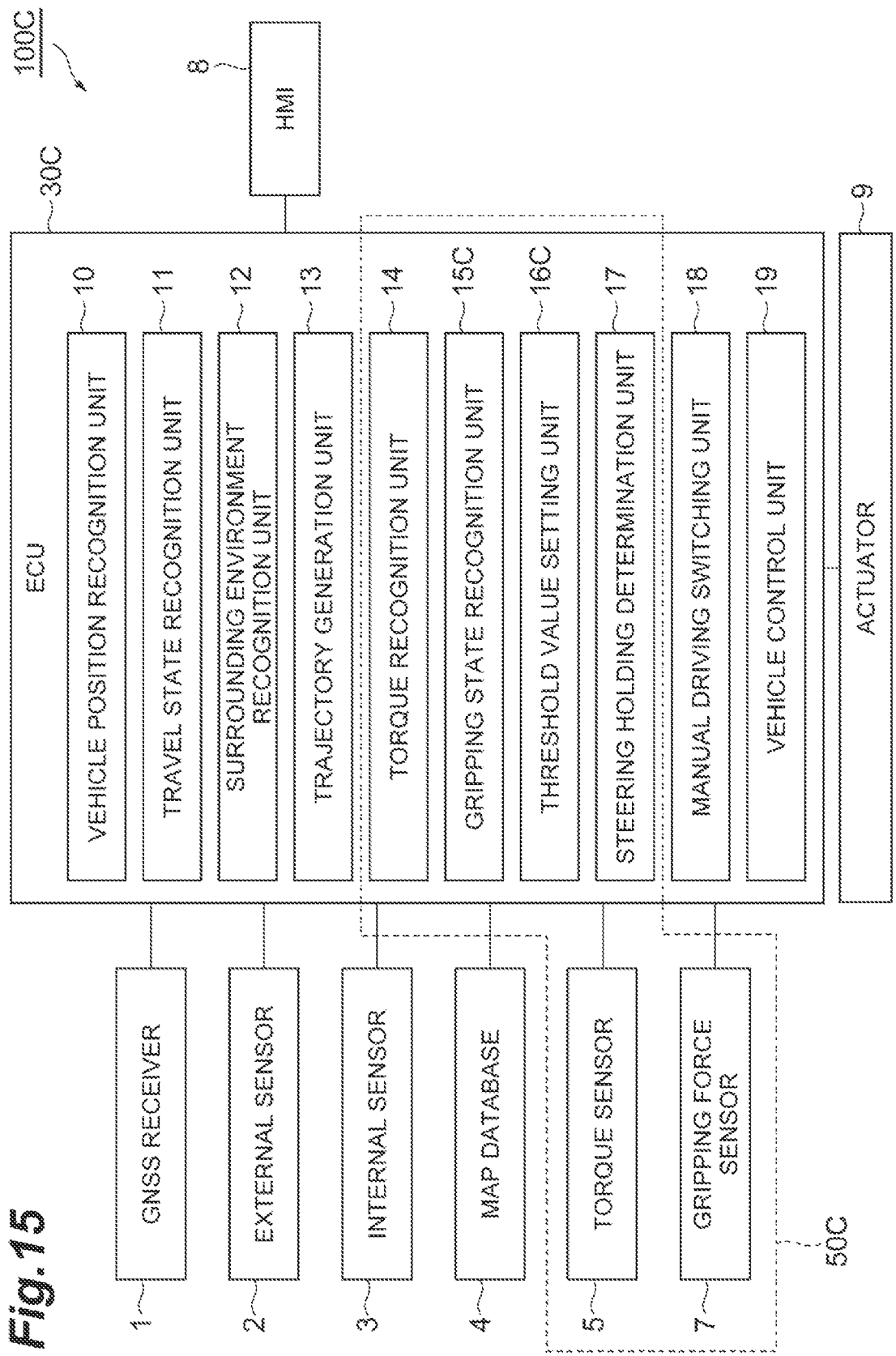
FIG. 15 is a block diagram illustrating an autonomous driving system including a steering holding determination device according to a third embodiment.

A steering holding determination device and an autonomous driving system according to a third embodiment will be described. FIG. 15 is a block diagram illustrating an autonomous driving system 100C including a steering holding determination device 50C according to the third embodiment. As illustrated in FIG. 15, the steering holding determination device 50C and the autonomous driving system 100C includes an ECU 30C instead of the ECU 30A and includes a gripping force sensor 7 instead of the touch sensor 6, and those are points different from the steering holding determination device 50A and the autonomous driving system 100A. In other points, the steering holding determination device 50C and the autonomous driving system 100C are configured in the same manner as the steering holding determination device 50A and the autonomous driving system 100A.

Configuration of Steering Holding Determination Device 50C and Autonomous Driving System 100C The gripping force sensor 7 is a sensor that is provided on the steering wheel 21 and detects the gripping force of the driver's hand gripping the steering wheel 21. For example, a capacitive type touch sensor can be used as the gripping force sensor 7. The gripping force sensor 7 transmits a detected gripping force signal to the ECU 30C when the driver holds the gripping force sensor 7 portion of the steering wheel 21.

In the present embodiment, as the gripping force sensor 7, for example, one sensor is provided over the circumference of the steering wheel 21. The gripping force sensor 7 is configured to be able to detect the gripping force of the driver's one hand or two hands gripping the steering wheel 21 as a common gripping force signal. The gripping force sensor 7 may be configured to detect the larger gripping force of the driver's two-hand gripping force as the common gripping force signal. In this case, instead of separately detecting the driver's two-hand gripping force, it may be configured to be able to detect as a single gripping force signal as a whole.

As illustrated in FIG. 15, the ECU 30C includes a gripping state recognition unit 15C and a threshold value setting unit (a second threshold value setting unit) 16C as functional configurations different from the contact state recognition unit 15A and the threshold value setting unit 16A of the ECU 30A.

The gripping state recognition unit 15C recognizes the presence or absence of driver's gripping of the steering wheel 21 (hereinafter simply referred to as "driver's gripping") based on the result of detection performed by the gripping force sensor 7. The gripping state recognition unit 15 C recognizes a gripping state or a non-gripping state based on the gripping force detected by the gripping force sensor 7. The gripping state means a state in which the driver's gripping of the steering wheel 21 is detected based on the gripping force detected by the gripping force sensor 7. The non-gripping state means a state in which the driver's grip of the steering wheel 21 is not detected based on the gripping force detected by the gripping force sensor 7.

Specifically, for example, if the gripping force detected by the gripping force sensor 7 is equal to or greater than a predetermined gripping force threshold value, the gripping state recognition unit 15C recognizes the gripping state in which the driver's gripping is detected by the gripping force sensor 7. For example, if the gripping force detected by the gripping force sensor 7 is lower than the predetermined gripping force threshold value, the gripping state recognition unit 15C recognizes the non-gripping state in which the driver's gripping is not detected by the gripping force sensor 7. The gripping force threshold value is a threshold value of the gripping force for detecting the driver's gripping. The gripping force threshold value may be a fixed value set in advance or a variable value.

The gripping state recognition unit 15C may recognize whether the gripping force sensor 7 is normal or in failure. The gripping state recognition unit 15C may recognize at least a grip-ON failure of the gripping force sensor 7 as a failure of the gripping force sensor 7. The grip-ON failure means that the driver's gripping is erroneously detected by the gripping force sensor 7 even though the driver does not grip the steering wheel 21. The grip-ON failure may include a grip-ON fixed failure which means that the driver's gripping is continuously detected erroneously. Whether the gripping force sensor 7 is normal or in failure is determined by the ECU 30C using a known method.

The gripping state recognition unit 15C recognizes the gripping state or the non-gripping state based on, for example, the gripping force signal from the gripping force sensor 7 and the result of recognition of whether gripping force sensor 7 is normal or in failure. FIG. 16 is a table illustrating an example of a content of recognition performed by the gripping state recognition unit 15C. In the left column of FIG. 16, the content of recognition performed by the gripping state recognition unit 15C when the gripping force sensor 7 is normal. In the right column of FIG. 16, the content of recognition performed by the gripping state recognition unit 15C when the gripping force sensor 7 is in failure. The content of recognition may be stored in the ECU 30C in advance as, for example, a program including a conditional expression.

The gripping state recognition unit 15C may recognize the non-gripping state when the driver's gripping is not detected and when the gripping force sensor 7 is recognized as normal. The gripping state recognition unit 15C may recognize the gripping state when the gripping force sensor 7 recognized as normal and when the driver's gripping is detected.

The gripping state recognition unit 15C may recognize the non-gripping state when the gripping force sensor 7 is recognized as being in failure. The gripping state recognition unit 15C may recognize the non-gripping state when at least the grip-ON failure of the gripping force sensor 7 is recognized among the failures of the gripping force sensor 7.

The threshold value setting unit 16C sets a steering torque threshold value (a second threshold value) based on the result of recognition performed by the gripping state recognition unit 15C, which is used to determine the steering holding state. For example, the threshold value setting unit 16C sets the steering torque threshold value when the gripping state is recognized by the gripping state recognition unit 15C, to TH6. For example, the threshold value setting unit 16C sets the steering torque threshold value when the non-gripping state is recognized by the gripping state recognition unit 15C, to TH7. The threshold value setting unit 16C sets the steering torque threshold value to TH7 when the non-gripping state is recognized by the gripping state recognition unit 15C, which is a larger value compared to TH6 when the gripping state is recognized by the gripping state recognition unit 15C.

The threshold value setting unit 16C may set the threshold value to TH7 as a value larger than TH6 as much as a predetermined addition value ΔTH4. The addition value ΔTH4 may be set in the same manner as the addition value ΔTH1. The addition value ΔTH4 may be the same value as the addition value ΔTH1 or may be a different value.

Example of Operation Processing by ECU 30C

Figure 17:
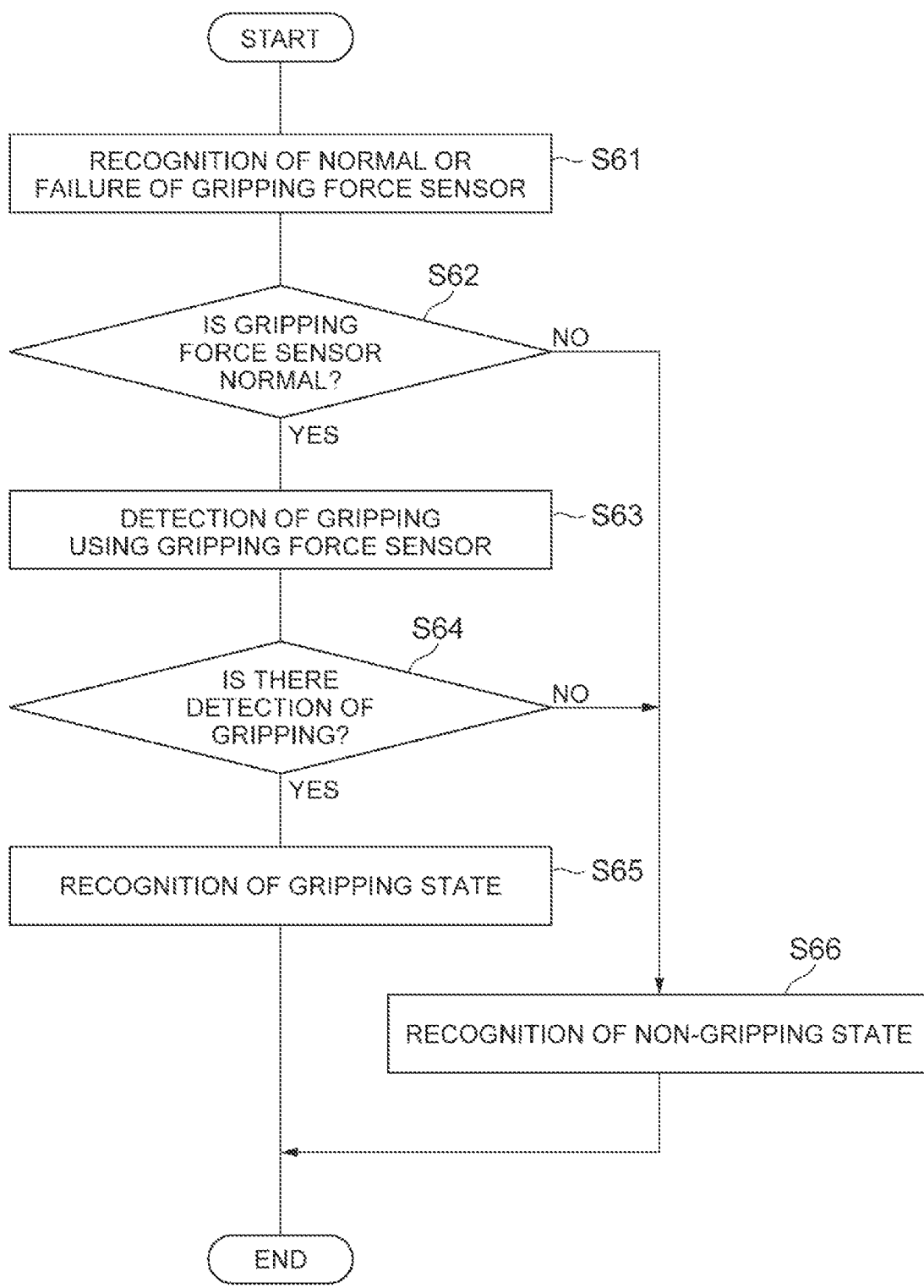
FIG. 17 is a flowchart of gripping state recognition processing by the steering holding determination device of FIG. 15.

Next, examples of operation processing by the steering holding determination device 50C and the autonomous driving system 100C will be described. FIG. 17 is a flowchart of the gripping state recognition processing by the steering holding determination device 50C. The processing in the flowchart illustrated in FIG. 17 is repeatedly executed, for example, at a predetermined operation cycle during the autonomous driving of the vehicle. The steering holding state determination processing and the manual-driving switching determination processing by the steering holding determination device 50C and the steering holding state determination processing by the autonomous driving system 100C are respectively the same as the processing in FIG. 6 and FIG. 7, and the description thereof will not be repeated.

In S61, the ECU 30C of the steering holding determination device 50C recognizes whether the gripping force sensor 7 is normal or in failure using the gripping state recognition unit 15C. The gripping state recognition unit 15C recognizes whether the gripping force sensor 7 is normal or in failure based on the result of determination performed by the ECU 30C whether the gripping force sensor 7 is normal or in failure.

In S62, the ECU 30C determines whether or not the gripping state recognition unit 15C recognizes that the gripping force sensor 7 is normal. When it is recognized by the gripping state recognition unit 15C that the gripping force sensor 7 is normal (YES in S62), in S63, the ECU 30C detects the driver's gripping using the gripping force sensor 7. When the driver grips the gripping force sensor 7 portion of the steering wheel 21, the gripping force sensor 7 transmits a gripping force signal to the ECU 30C. In addition, in S63, the ECU 30C recognizes whether or not the driver's gripping is detected by the gripping force sensor 7 using the gripping state recognition unit 15C. For example, when the gripping force detected by the gripping force sensor 7 is equal to or greater than the gripping force threshold value, the gripping state recognition unit 15C recognizes that the driver's gripping is detected by the gripping force sensor 7.

In S64, The ECU 30C determines whether or not the driver's gripping is detected by the gripping force sensor 7 using the gripping state recognition unit 15C. When it is recognized by the gripping state recognition unit 15C that the gripping is detected by the gripping force sensor 7 (YES in S64), in S65, the ECU 30C recognizes the gripping state using the gripping state recognition unit 15C. Thereafter, the ECU 30C ends the processing in FIG. 17.

On the other hand, when it is recognized by the gripping state recognition unit 15C that the gripping is not detected by the gripping force sensor 7 (NO in S64), in S66, the ECU 30C recognizes the non-gripping state using the gripping state recognition unit 15C. Thereafter, the ECU 30C ends the processing in FIG. 17.

On the other hand, when it is recognized by the gripping state recognition unit 15C that the gripping force sensor 7 is in failure (NO in S62), in S66, the ECU 30C recognizes the non-gripping state using the gripping state recognition unit 15C. Thereafter, the ECU 30C ends the processing in FIG. 17.

Figure 18:
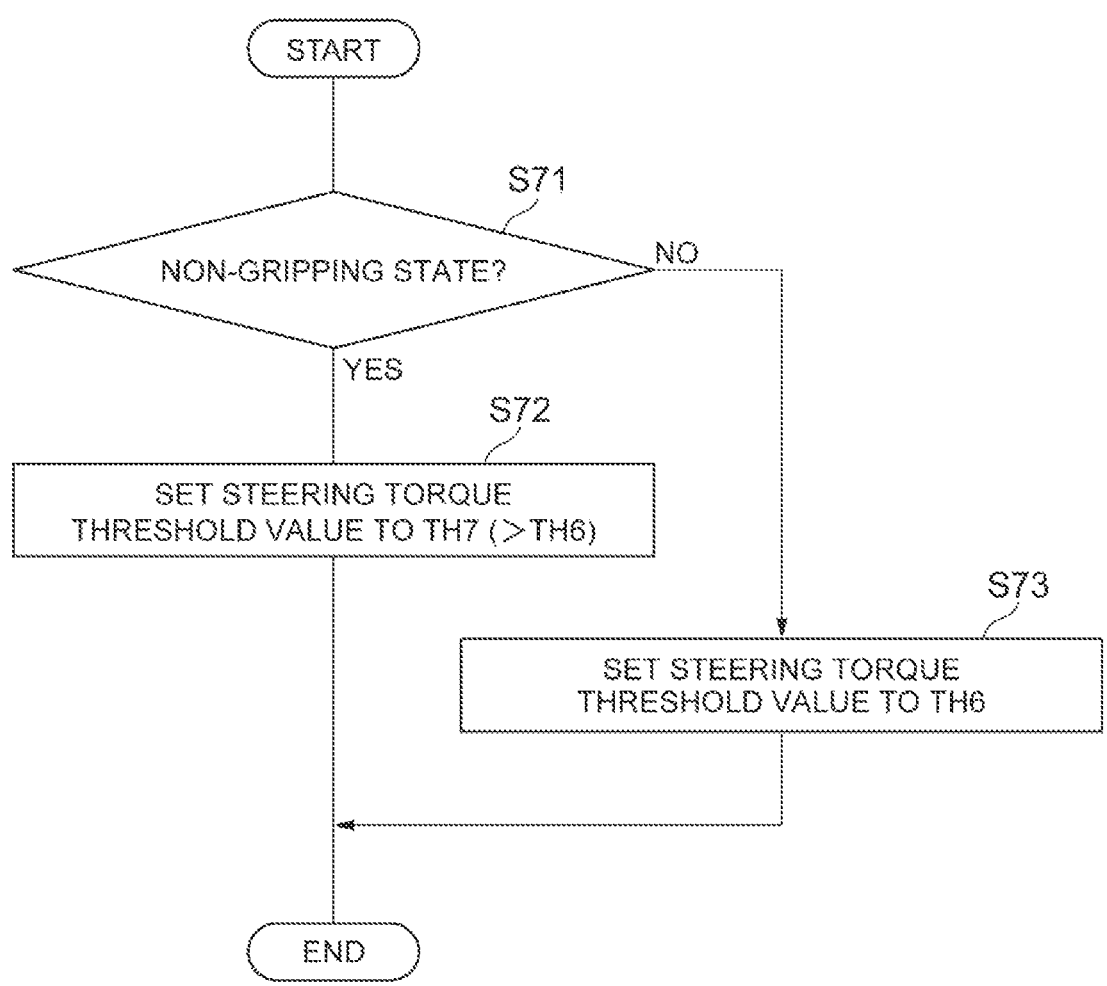
FIG. 18 is a flowchart of threshold value setting processing by the steering holding determination device in FIG. 15.

FIG. 18 is a flowchart of the threshold value setting processing by the steering holding determination device 50C. The processing of the flowchart illustrated in FIG. 18 is repeatedly performed, for example, for every predetermined operation cycle during the autonomous driving of the vehicle.

In S71, the ECU 30C determines whether or not the result of recognition performed by the gripping state recognition unit 15C is a non-gripping state using the threshold value setting unit 16C. When it is determined that the result of recognition performed by the gripping state recognition unit 15C is the non-gripping state (YES in S71), in S72, the ECU 30C sets the steering torque threshold value to the threshold value TH7 using the threshold value setting unit 16C. Thereafter, the ECU 30C ends the operation processing in FIG. 18.

When it is determined that the result of recognition performed by the gripping state recognition unit 15C is the gripping state (NO in S71), in S73, the ECU 30C sets the steering torque threshold value to the threshold value TH6 using the threshold value setting unit 16C. Thereafter, the ECU 30C ends the processing in FIG. 18.

As described above, according to the steering holding determination device 50C, when the driver's gripping is not detected by the gripping force sensor 7, since the steering torque threshold value is set to a larger value compared to the case when the driver's gripping is detected, it becomes difficult for the steering holding determination unit 17 to determine that the driver is in the steering holding state. Accordingly, it is possible to suppress the erroneous determination of the steering holding state even though the driver does not intend to hold the steering wheel in such a case where there is a torque input to the steering shaft 22 caused by the road surface disturbance or the like when the driver's hand is away from the steering wheel 21. As a result, it is possible to appropriately determine the driver's steering holding state based on the steering torque.

In the steering holding determination device 50C, the gripping state recognition unit 15C recognizes whether the gripping force sensor 7 is normal or in failure, and recognizes the non-gripping state if it is recognized that the gripping force sensor 7 is in failure. In this way, for example, even in a case of grip-ON failure of the gripping force sensor 7 where the driver's gripping is erroneously detected by the gripping force sensor 7, since the state is regarded as a non-gripping state, the steering torque threshold value is set to a larger value compared to a case when the gripping force sensor 7 detects the driver's gripping when the gripping force sensor 7 is normal. As a result thereof, for example, even in a case of grip-ON failure of the gripping force sensor 7, it is possible to suppress the inappropriate determination of the driver's steering holding state.

The autonomous driving system 100C includes the steering holding determination device 50C described above and the manual-driving switching unit 18 that performs the manual-driving switching control when the steering holding determination unit 17 of the steering holding determination device 50C determines that the driver is in the steering holding state during the autonomous driving. In this way, it possible to realize the appropriate switching of the driving mode to the manual-driving based on the result of determination of the driver's steering holding state appropriately determined based on the steering torque.

Fourth Embodiment

Figure 19:
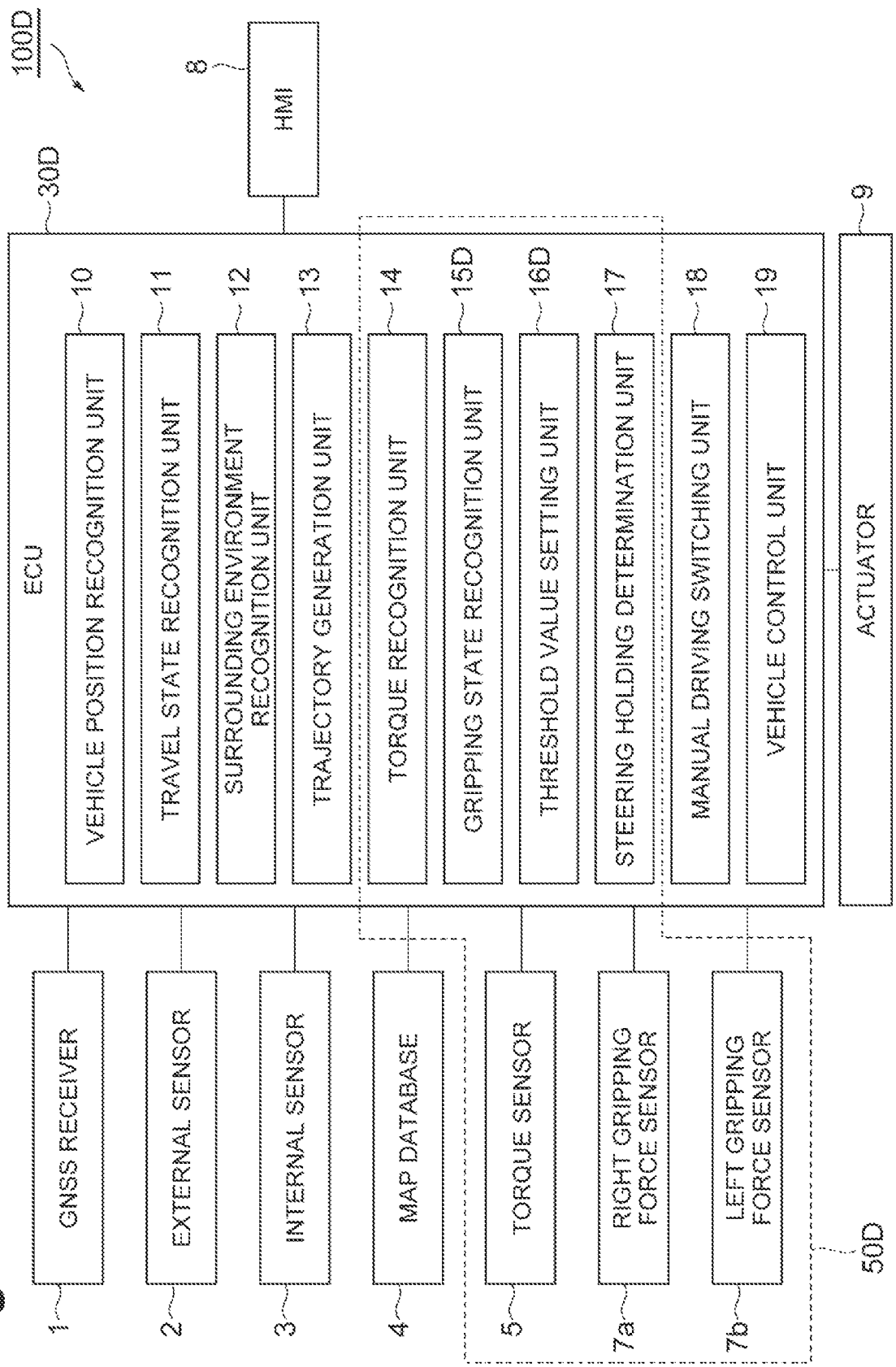
FIG. 19 is a block diagram illustrating an autonomous driving system including a steering holding determination device according to a fourth embodiment.

A steering holding determination device and an autonomous driving system according to a fourth embodiment will be described. FIG. 19 is a block diagram illustrating an autonomous driving system 100D including a steering holding determination device 50D according to the fourth embodiment. As illustrated in FIG. 19, the steering holding determination device 50D and the autonomous driving system 100D includes an ECU 30D instead of the ECU 30C and the gripping force sensor 7 is configured to include a right gripping force sensor 7a and a left gripping force sensor 7b, and those are points different from the steering holding determination device 50C and the autonomous driving system 100C. In other points, the steering holding determination device 50D and the autonomous driving system 100D are configured in the same manner as the steering holding determination device 50C and the autonomous driving system 100C.

Configuration of Steering Holding Determination Device 50D and Autonomous Driving System 100D The right gripping force sensor 7a and the left gripping force sensor 7b are sensors provided on the steering wheel 21 for detecting the gripping force of the driver's hand gripping the steering wheel 21.

The right gripping force sensor 7a is provided, for example, on the right side of the driver toward the steering wheel 21 in the straight traveling state of the vehicle. In the present embodiment, as the right gripping force sensor 7a, for example, one sensor is provided over the half circumference of the steering wheel on the right hand side of the driver. When the driver grips the right gripping force sensor 7a portion of the steering wheel 21, the right gripping force sensor 7a transmits a gripping force signal to the ECU 30D independently of the left gripping force sensor 7b.

The left gripping force sensor 7b is provided, for example, on the left side of the driver toward the steering wheel 21 in the straight traveling state of the vehicle. In the present embodiment, as the left gripping force sensor 7b, for example, one sensor is provided over the half circumference of the steering wheel on the left hand side of the driver. When the driver grips the left gripping force sensor 7b portion of the steering wheel 21, the left gripping force sensor 7b transmits a gripping force signal to the ECU 30D independently of the right gripping force sensor 7a.

As illustrated in FIG. 19, the ECU 30D includes a gripping state recognition unit 15D and a threshold value setting unit (a second threshold value setting unit) 16D as functional configurations different from the gripping state recognition unit 15C and the threshold value setting unit 16C of the ECU 30C.

The gripping state recognition unit 15D recognizes the presence or absence of the driver's gripping based on the results of detection performed by the right gripping force sensor 7a and the left gripping force sensor 7b. The gripping state recognition unit 15D recognizes the gripping state based on the gripping force signals from the right gripping force sensor 7a and the left gripping force sensor 7b while dividing the gripping state into a two-hand gripping state and a one-hand gripping state. The two-hand gripping state means a state in which the driver's gripping of the steering wheel 21 is detected by the right gripping force sensor 7a and the left gripping force sensor 7b. The one-hand gripping state means a state in which the driver's gripping of the steering wheel 21 is detected by the right gripping force sensor 7a or the left gripping force sensor 7b.

Specifically, for example, when the gripping force detected by the right gripping force sensor 7a is equal to or greater than a predetermined gripping force threshold value, and the gripping force detected by the left gripping force sensor 7b is equal to or greater than the predetermined gripping force threshold value, the gripping state recognition unit 15D recognizes the two-hand gripping state. For example, when the gripping force detected by the right gripping force sensor 7a is equal to or greater than the gripping force threshold value, and the gripping force detected by the left gripping force sensor 7b is less than the gripping force threshold value, the gripping state recognition unit 15D recognizes the one-hand gripping state. For example, when the gripping force detected by the right gripping force sensor 7a is less than the gripping force threshold value and the gripping force detected by the left gripping force sensor 7b is equal to or greater than the gripping force threshold value, the gripping state recognition unit 15D recognizes the one-hand gripping state. For example, when the gripping force detected by the right gripping force sensor 7a is less than the gripping force threshold value and the gripping force detected by the left gripping force sensor 7b is less than the gripping force threshold value, the gripping state recognition unit 15D recognizes the non-gripping state. The gripping force threshold value for the right gripping force sensor 7a and the gripping force threshold value for the left gripping force sensor 7b may be the same values of the gripping force or may be values of the gripping force different from each other.

The gripping state recognition unit 15D may recognize whether each of the right gripping force sensor 7a and the left gripping force sensor 7b is normal or in failure. The gripping state recognition unit 15D may recognize at least the grip-ON failure of the right gripping force sensor 7a as a failure of the right gripping force sensor 7a. The gripping state recognition unit 15D may recognize at least the grip-ON failure of the left gripping force sensor 7b as a failure of the left gripping force sensor 7b.

The gripping state recognition unit 15D recognizes the two-hand gripping state, the one-hand gripping states, or the non-gripping states based on, for example, the gripping force signals from the right gripping force sensor 7a and the left gripping force sensor 7b and the result of recognition of whether the right gripping force sensor 7a and the left gripping force sensor 7b are normal or in failure. FIG. 20 is a diagram illustrating an example of a content of recognition performed by the gripping state recognition unit 15D. The center column in FIG. 20 illustrates a content of recognition performed by the gripping state recognition unit 15D when the right gripping force sensor 7a is normal. The right column in FIG. 20 illustrates a content of recognition performed by the gripping state recognition unit 15D when the right gripping force sensor 7a is in failure. The center row in FIG. 20 illustrates a content of recognition performed by the gripping state recognition unit 15D when the left gripping force sensor 7b is normal. The lower row in FIG. 20 illustrates a content of recognition performed by the gripping state recognition unit 15D when the left gripping force sensor 7b is in failure. The content of recognition may be stored in the ECU 30D in advance as, for example, a program including a conditional expression.

If it is recognized that both the gripping force sensors 7a and the 7b are normal, and when the driver's gripping is not detected by both the gripping force sensors 7a and 7b, the gripping state recognition unit 15D may recognize the non-gripping state. If it is recognized that both the right gripping force sensor 7a and the left gripping force sensor 7b are normal, and when the driver's gripping is detected by the right gripping force sensor 7a or the left gripping force sensor 7b, the gripping state recognition unit 15D may recognize the one-hand gripping state. If it is recognized that both the right gripping force sensor 7a and the left gripping force sensor 7b are normal, and when the driver's gripping is detected by both the gripping force sensors 7a and 7b, the gripping state recognition unit 15D may recognize the two-hand gripping state.

If any one of the right gripping force sensor 7a and the left gripping force sensor 7b is normal and the other is in failure, and when the driver's gripping is not detected by the right gripping force sensor 7a or the left gripping force sensor 7b which were recognized as normal, the gripping state recognition unit 15D may recognize the non-gripping state. If any one of the right gripping force sensor 7a and the left gripping force sensor 7b is normal and the other is in failure, and when the driver's gripping is detected by the right gripping force sensor 7a or the left gripping force sensor 7b which were recognized as normal, the gripping state recognition unit 15D may recognize the two-hand gripping state.

If it is recognized that both the right gripping force sensor 7a and the left gripping force sensor 7b are in failure, the gripping state recognition unit 15D may recognize the non-gripping state. If it is recognized that both the right gripping force sensor 7a and the left gripping force sensor 7b are in failure, and the grip-ON failure of any one is recognized, the gripping state recognition unit 15D may recognize the non-gripping state.

The threshold value setting unit 16D sets the steering torque threshold value (the second threshold value) based on the result of recognition performed by the gripping state recognition unit 15D. If the non-gripping state is recognized by the gripping state recognition unit 15D, the threshold value setting unit 16D sets the steering torque threshold value to a larger value compared to the case when the one-hand gripping state or the two-hand gripping state (the gripping state) is recognized by the gripping state recognition unit 15D.

For example, the threshold value setting unit 16D sets the steering torque threshold value when the two-hand gripping state is recognized by the gripping state recognition unit 15D to TH8. For example, the threshold value setting unit 16D sets the steering torque threshold value when the one-hand gripping state is recognized by the gripping state recognition unit 15D to TH9. For example, the threshold value setting unit 16D sets the steering torque threshold value when the non-gripping state is recognized by the gripping state recognition unit 15D to TH10. The threshold value setting unit 16D sets the steering torque threshold value to TH9 when the one-hand gripping state is recognized by gripping state recognition unit 15D, which is a larger value compared to TH8 when the two-hand gripping state is recognized by gripping state recognition unit 15D. The threshold value setting unit 16D sets the steering torque threshold value to TH10 when the non-gripping state is recognized by the gripping state recognition unit 15D, which is a larger value compared to TH9 when the one-hand gripping state is recognized by gripping state recognition unit 15D.

The threshold value setting unit 16D may set the threshold value to TH9 which is larger than TH8 as much as a predetermined addition value $\Delta TH5$. The threshold value setting unit 16D may set the threshold value to TH10 which is a value larger than TH9 as much as a predetermined addition value $\Delta TH6$. The addition values $\Delta TH5$ and $\Delta TH6$ may be set in the same manner as the addition values $\Delta TH2$ $\Delta TH3$. The sum of the addition values $\Delta TH5$ and $\Delta TH6$ may be the value same as the addition value $\Delta TH4$ or may be a different value. For example, the addition value $\Delta TH6$ may be the same value as the addition value $\Delta TH5$ or may be a value larger than the addition value $\Delta TH5$.

Example of Operation Processing by ECU 30D

With regard to an example of operation processing by the steering holding determination device 50D and the autonomous driving system 100D, the gripping state recognition processing and the threshold value setting processing which are different from the processing by the steering holding determination device 50C and the autonomous driving system 100C will be described with reference to FIG. 21 to FIG. 25. The steering holding state determination processing and the manual-driving switching determination processing by the steering holding determination device 50D and the autonomous driving system 100D are respectively the same as the processing in FIG. 6 and FIG. 7, and thus, the descriptions thereof will be not be repeated.

Figure 21:
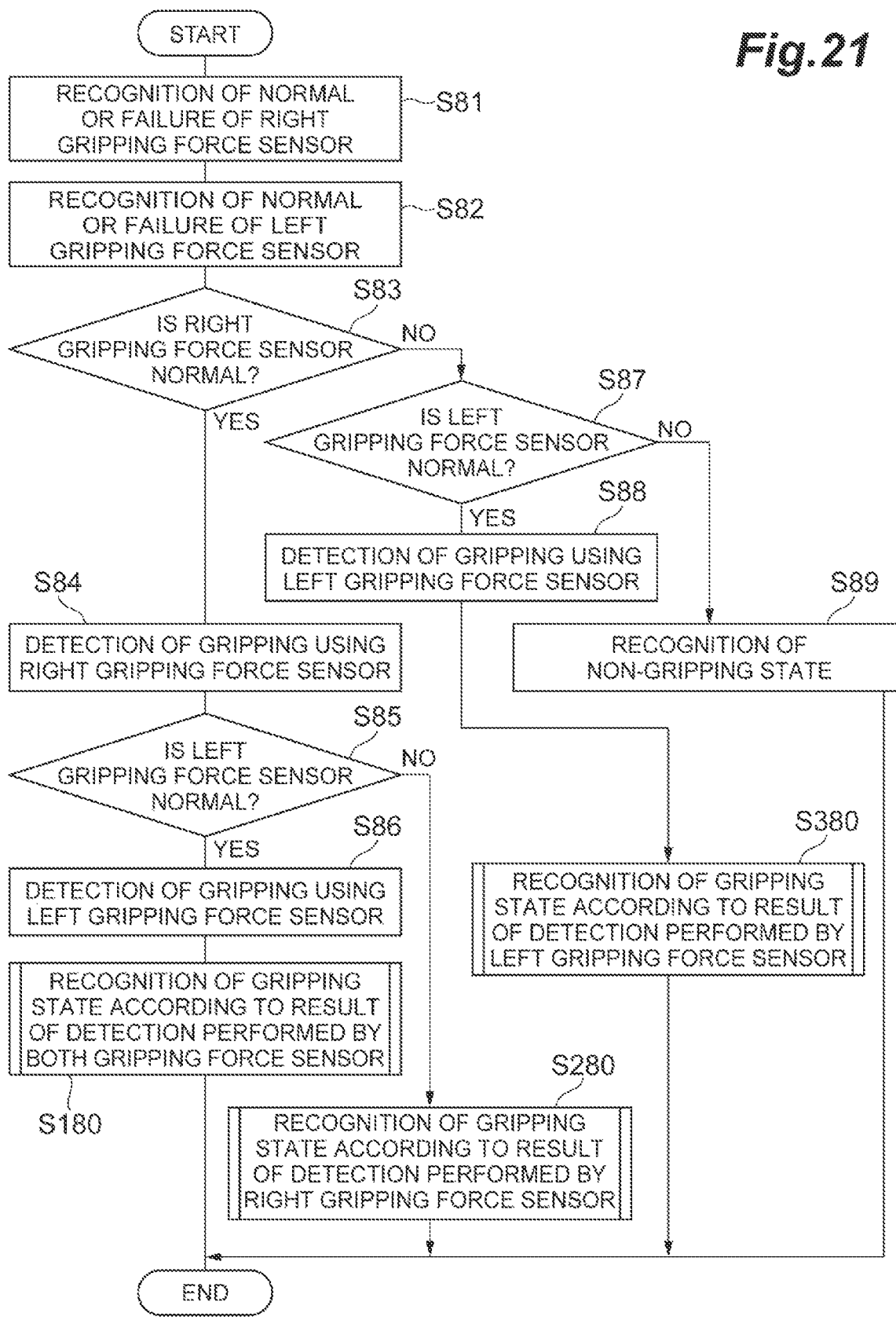
FIG. 21 is a flowchart of the gripping state recognition processing by the steering holding determination device of FIG. 19.
Figure 22:
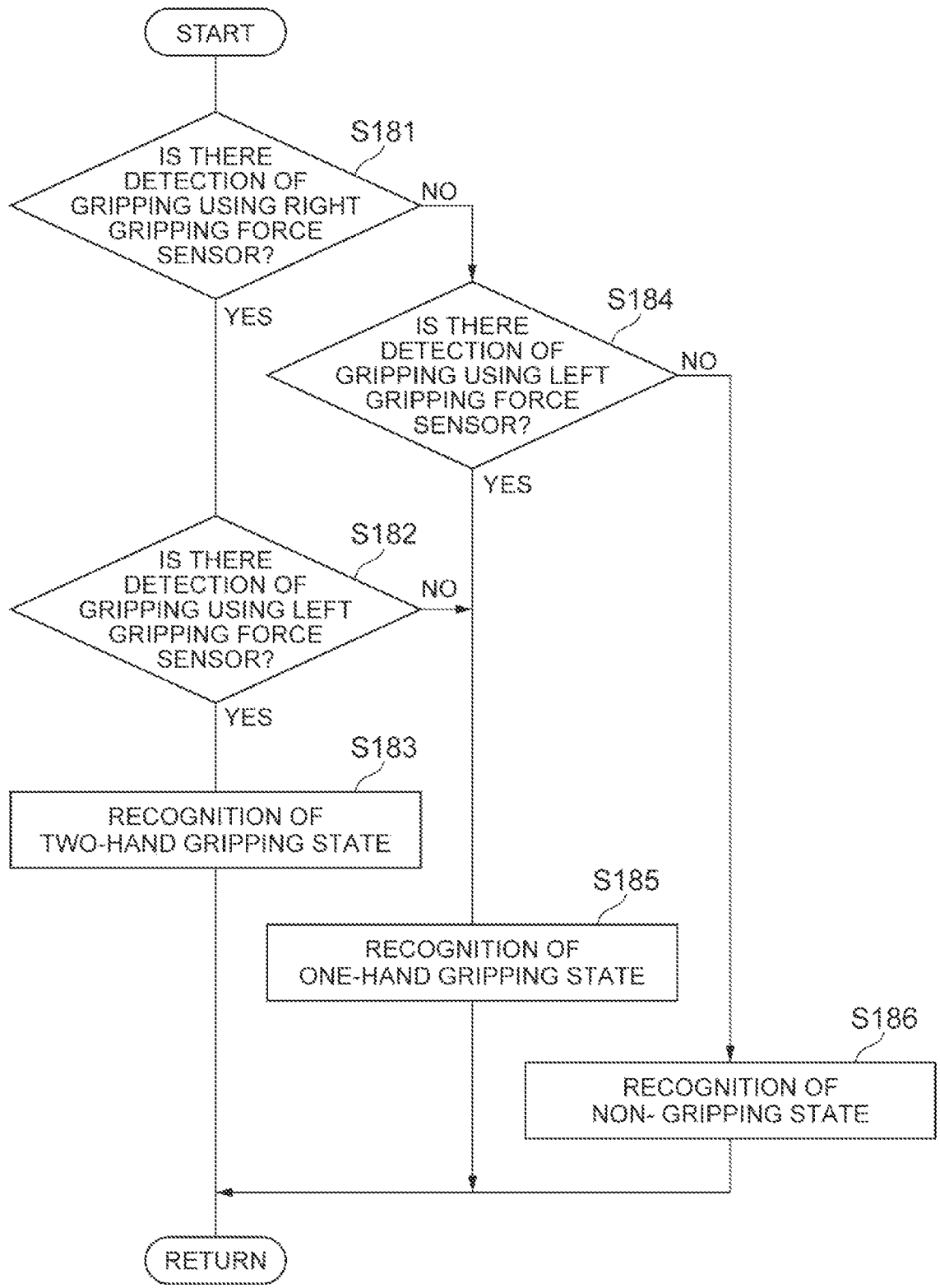
FIG. 22 is a flowchart specifically illustrating the processing in S180 in FIG. 21.
Figure 23:
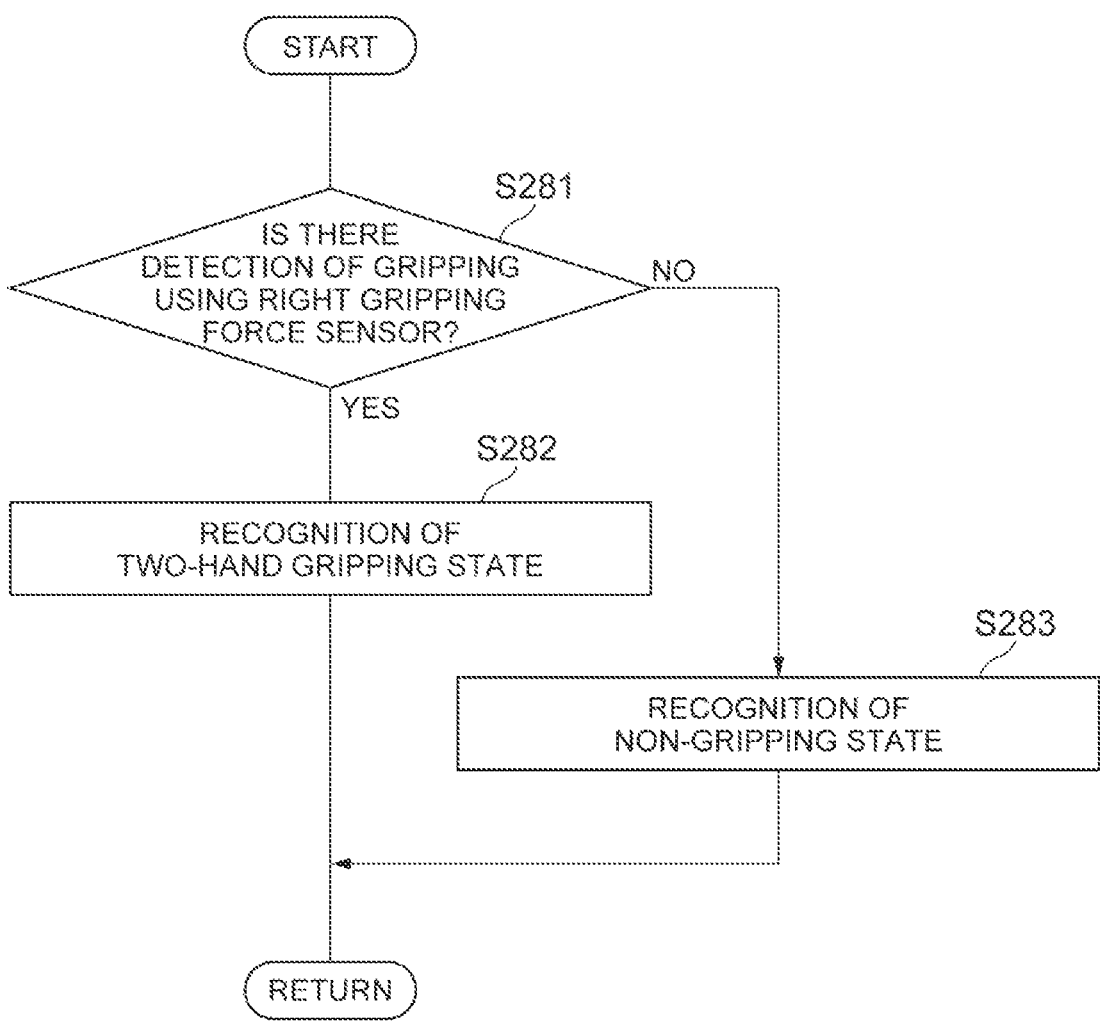
FIG. 23 is a flowchart specifically illustrating the processing in S280 in FIG. 21.
Figure 24:
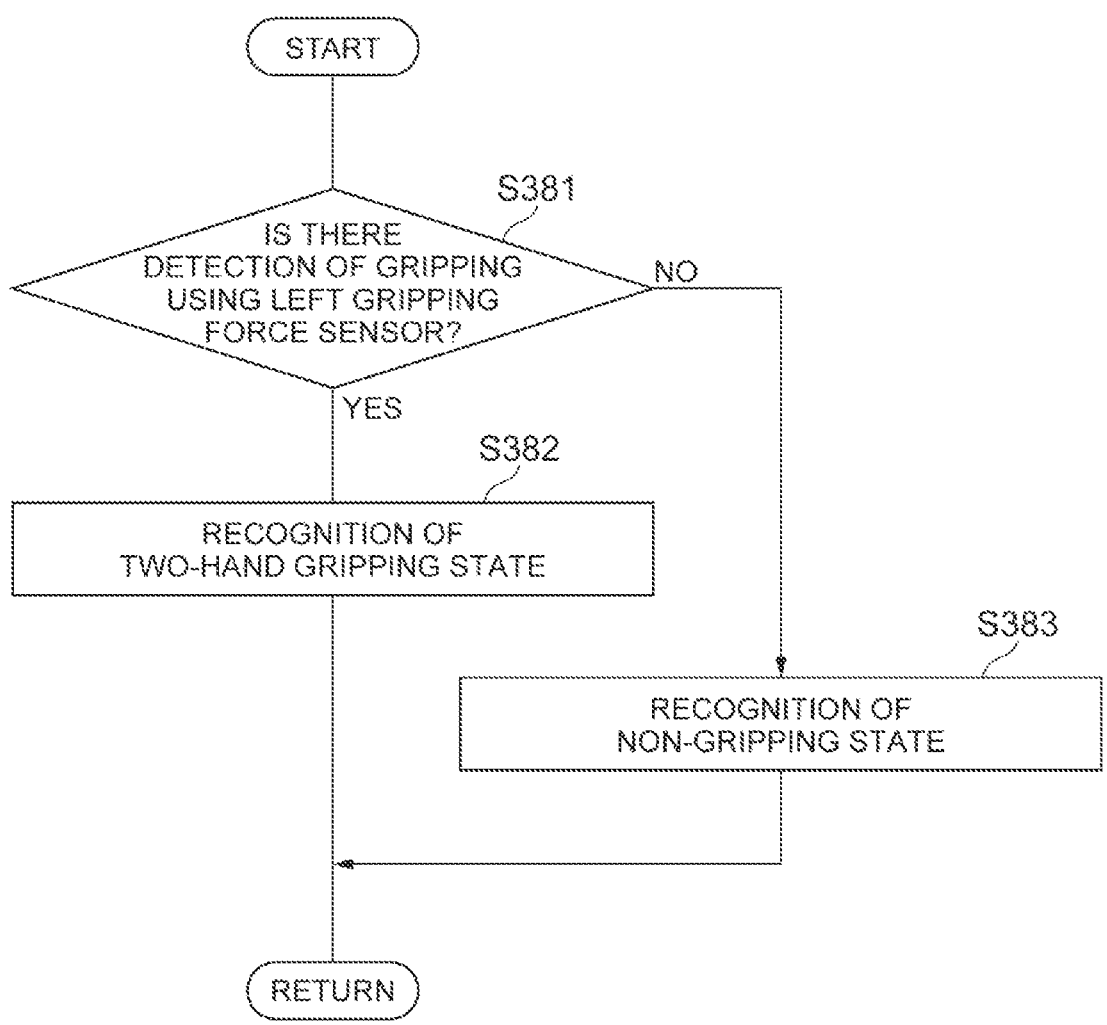
FIG. 24 is a flowchart specifically illustrating the processing in S380 in FIG. 21.

FIG. 21 is a flowchart of the gripping state recognition processing by the steering holding determination device 50D. FIG. 22 is a flowchart specifically illustrating the processing in S180 in FIG. 21. FIG. 23 is a flowchart specifically illustrating the processing in S280 in FIG. 21. FIG. 24 is a flowchart specifically illustrating the processing in S380 in FIG. 21. The processing in the flowcharts illustrated in FIG. 21 to FIG. 25 are repeatedly performed, for example, at predetermined operation cycles during the autonomous driving of the vehicle.

In S81, the ECU 30D of the steering holding determination device 50D recognizes whether the right gripping force sensor 7a is normal or in failure using the gripping state recognition unit 15D. The gripping state recognition unit 15D recognizes whether the right gripping force sensor 7a is normal or in failure based on the result of determination performed by the ECU 30D whether the right gripping force sensor 7a is normal or in failure.

In S82, the ECU 30D recognizes whether the left gripping force sensor 7b is normal or in failure using the gripping state recognition unit 15D. The gripping state recognition unit 15D recognizes whether the left gripping force sensor 7b is normal or in failure based on the result of determination performed by the ECU 30D whether the left gripping force sensor 7b is normal or in failure.

In S83, the ECU 30D determines whether or not the gripping state recognition unit 15D recognizes that the right gripping force sensor 7a is normal. When it is recognized by the gripping state recognition unit 15D that the right gripping force sensor 7a is normal (YES in S83), the ECU 30D detects the driver's gripping of the right gripping force sensor 7a using the right gripping force sensor 7a in S84. When the driver grips the right gripping force sensor 7a part of the steering wheel 21, the right gripping force sensor 7a transmits a gripping force signal to the ECU 30D. In addition, in S84, the ECU 30D recognizes whether the driver's gripping is detected by the right gripping force sensor 7a or not using the gripping state recognition unit 15D. For example, when the gripping force detected by the right gripping force sensor 7a is equal to or greater than the gripping force threshold value, the gripping state recognition unit 15D recognizes that the driver's gripping is detected by the right gripping force sensor 7a.

In S85, the ECU 30D determines whether or not the gripping state recognition unit 15D recognizes that the left gripping force sensor 7b is normal. When it is recognized by the gripping state recognition unit 15D that the left gripping force sensor 7b is normal (YES in S85), in S86, the ECU 30D detects the driver's gripping of the gripping force sensor 7b using the gripping force sensor 7b. When the driver grips the left gripping force sensor 7b portion on the steering wheel 21, the left gripping force sensor 7b transmits a gripping force signal to the ECU 30D. In addition, in S86, the ECU 30D recognizes whether the driver's gripping is detected by the left gripping force sensor 7b or not using the gripping state recognition unit 15D. For example, when the gripping force detected by the left gripping force sensor 7b is equal to or greater than the gripping force threshold value, the gripping state recognition unit 15D recognizes that the driver's gripping is detected by the left gripping force sensor 7b.

In S180, the ECU 30D recognizes the gripping state according to the result of detection performed by both the gripping force sensors 7a and 7b using the gripping state recognition unit 15D. Specifically, as illustrated in FIG. 22, in S181, the ECU 30D determines whether or not the driver's gripping is detected by the right gripping force sensor 7a using the gripping state recognition unit 15D. If it is recognized by the gripping state recognition unit 15D that the driver's gripping is detected by the right gripping force sensor 7a (YES in S18), in S182, the ECU 30D determines whether or not the driver's gripping is detected by the left gripping force sensor 7b using the gripping state recognition unit 15D. When it is recognized by the gripping state recognition unit 15D that the driver's gripping is detected by the left gripping force sensor 7b (YES S182), in S183, the ECU 30D recognizes the two-hand gripping state. Alternatively, when it is recognized by the gripping state recognition unit 15D that the driver's gripping is not detected by the left gripping force sensor 7b (NO in S182), in S185, the ECU 30D recognizes the one-hand gripping state in S183. Thereafter, the ECU 30D ends the processing in FIG. 21.

On the other hand, if it is recognized by the gripping state recognition unit 15D that the driver's gripping is not detected by the right gripping force sensor 7a (NO in S181), in S184, the ECU 30D determines whether or not the driver's gripping is detected by the left gripping force sensor 7b using the gripping state recognition unit 15D. If it is recognized by the gripping state recognition unit 15D that the driver's gripping is detected by the left gripping force sensor 7b (YES in S184), the ECU 30D recognizes the one-hand gripping state in S185. Alternatively, if it is recognized by the gripping state recognition unit 15D that the driver's gripping is not detected by the left gripping force sensor 7b (NO in S184), the ECU 30D recognizes the non-gripping state in S185. Thereafter, the ECU 30D ends the processing in FIG. 21 and FIG. 22.

Returning to FIG. 21, when it is recognized by the gripping state recognition unit 15D that the left gripping force sensor 7b is in failure (NO in S85), in S280, the ECU 30D recognizes the gripping state according to the result of detection by the right gripping force sensor 7a using the gripping state recognition unit 15D. Specifically, as illustrated in FIG. 23, in S281, the ECU 30D determines whether or not the driver's gripping is detected by the right gripping force sensor 7a using the gripping state recognition unit 15D. If it is recognized by the gripping state recognition unit 15D that the driver's gripping is detected by the right gripping force sensor 7a (YES in S281), the ECU 30D recognizes the two-hand gripping state in S282. If it is recognized by the gripping state recognition unit 15D that the driver's gripping is not detected by the right gripping force sensor 7a (NO in S281), the ECU 30D recognizes the non-gripping state in S283. Thereafter, the ECU 30D ends the processing in FIG. 21 and FIG. 23.

Returning to FIG. 21, when it is recognized by the gripping state recognition unit 15D that the right gripping force sensor 7a is in failure (NO in S83), in S87, the ECU 30D determines whether the left gripping force sensor 7b is normal or in failure using the gripping state recognition unit 15D.

When it is recognized by the gripping state recognition unit 15D that the left gripping force sensor 7b is normal (YES in S87), in S88, the ECU 30D recognizes whether the driver's gripping is detected by the left gripping force sensor 7b or not using the gripping state recognition unit 15D similarly to S86. In S380, the ECU 30D recognizes the gripping state according to the result of detection performed by the left gripping force sensor 7b using the gripping state recognition unit 15D. Specifically, as illustrated in FIG. 24, in S381, the ECU 30D determines whether or not the driver's gripping is detected by the left gripping force sensor 7b using the gripping state recognition unit 15D. When it is recognized by the gripping state recognition unit 15D that the driver's gripping is detected by the left gripping force sensor 7b (YES in S381), the ECU 30D recognizes the two-hand gripping state in S382. Alternatively, when it is recognized by the gripping state recognition unit 15D that the driver's gripping is not detected by the left gripping force sensor 7b (NO in S381), the ECU 30D recognizes the non-gripping state in S383. Thereafter, the ECU 30D ends the processing in FIG. 21 and FIG. 24.

Returning to FIG. 21, when it is recognized by the gripping state recognition unit 15D that the left gripping force sensor 7b is in failure (NO in S87), in S89, the ECU 30D recognizes the non-gripping state using gripping state recognition unit 15D. Thereafter, the ECU 30D ends the processing in FIG. 21.

Figure 25:
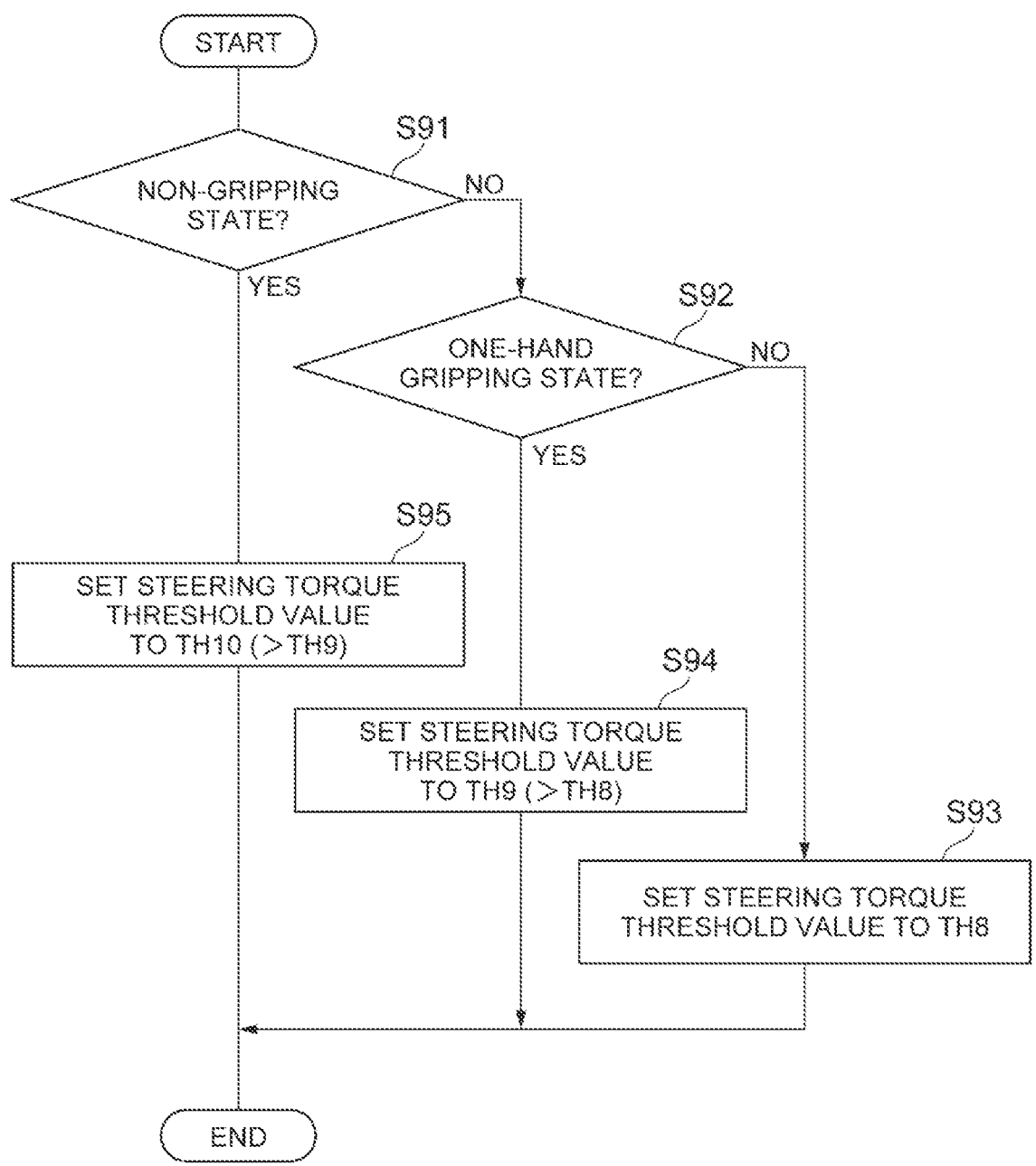
FIG. 25 is a flowchart of threshold value setting processing by the steering holding determination device in FIG. 19.

FIG. 25 is a flowchart of threshold value setting processing by the steering holding determination device 50D. The processing of the flowchart illustrated in FIG. 25 is repeatedly executed, for example, for each predetermined operation cycle during the autonomous driving of the vehicle.

In S91, the ECU 30D determines whether or not the result of recognition performed by the gripping state recognition unit 15D is the non-gripping state using the threshold value setting unit 16D. When it is determined that the result of recognition performed by the gripping state recognition unit 15D is not the non-gripping state (NO in S91), in S92, the ECU 30D determines whether or not the result of recognition performed by the gripping state recognition unit 15D is the one-hand gripping state using the threshold value setting unit 16D. When it is determined that the result of recognition performed by the gripping state recognition unit 15D is not the one-hand gripping state (NO in S92), in S93, the ECU 30D sets the steering torque threshold value to the threshold value TH8 using the threshold value setting unit 16D. Thereafter, the ECU 30D ends the processing in FIG. 25.

When it is determined that the result of recognition performed by the gripping state recognition unit 15D is the one-hand gripping state (YES in S92), in S94, the ECU 30D sets the steering torque threshold value to the threshold value TH9 using the threshold value setting unit 16D. Thereafter, the ECU 30D ends the processing in FIG. 25.

When it is determined that the result of recognition performed by the gripping state recognition unit 15D is the non-gripping state (YES in S91), in S95, the ECU 30D sets the steering torque threshold value to the threshold value TH10 using the threshold value setting unit 16D. Thereafter, the ECU 30D ends the processing in FIG. 25.

As described above, according to the steering holding determination device 50D, the gripping force sensor 7 includes the right gripping force sensor 7a and the left gripping force sensor 7b. The gripping state recognition unit 15D recognizes the gripping state based on the result of detection performed by the right gripping force sensor 7a and the left gripping force sensor 7b, while dividing the gripping state into the two-hand gripping state which is detected by the right gripping force sensor 7a and the left gripping force sensor 7b and the two-hand gripping state which is detected by the right gripping force sensor 7a or the left gripping force sensor 7b. When the one-hand gripping state is recognized by the gripping state recognition unit 15D, the threshold value setting unit 16D sets the steering torque threshold value to a larger value compared to the case when the two-hand gripping state is recognized by the gripping state recognition unit 15D. In this way, it is possible to appropriately set the steering torque threshold value using the right gripping force sensor 7a and the left gripping force sensor 7b.

In the steering holding determination device 50D, the gripping state recognition unit 15D recognizes whether the right gripping force sensor 7a and the left gripping force sensor 7b are normal or in failure, respectively. If any one of the right gripping force sensor 7a and the left gripping force sensor 7b is normal and the other is in failure, and when the gripping is detected by the right gripping force sensor 7a or the left gripping force sensor 7b which was recognized as normal, the gripping state recognition unit 15D recognizes the two-hand gripping state. In this case, since the gripping is detected by the right gripping force sensor 7a or the left gripping force sensor 7b which was recognized as normal, there is a possibility that the driver may have an intention to hold the steering wheel. Therefore, the state is regarded as the two-hand gripping state, and thus, the steering torque threshold value is set to a value when the driver's gripping is detected by the right gripping force sensor 7a and the left gripping force sensor 7b when the right gripping force sensor 7a and the left gripping force sensor 7b are normal. As a result, it becomes easier for the steering holding determination unit 17 to determine that the driver is in the steering holding state. As a result thereof, it is possible to appropriately set the steering torque threshold value in response to the possibility of the driver's intention to hold the steering wheel.

The autonomous driving system 100D includes the above-described steering holding determination device 50D, and the manual-driving switching unit 18 that performs the manual-driving switching control when the steering holding determination unit 17 of the steering holding determination device 50D determines that the driver is in the steering holding state during the autonomous driving. In this way, it possible to realize the appropriate switching of the driving mode to the manual-driving based on the result of determination of the driver's steering holding state appropriately determined based on the steering torque.

Modification Example

The present disclosure is not limited to the embodiments described above. The present disclosure can be embodied in various forms including various modifications and improvements based on the knowledge of those skilled in the art, including the embodiments described above.

In the first embodiment described above, the contact state recognition unit 15A may not necessarily recognize that the touch sensor 6 is normal or in failure. In this case, the recognition of the contact state or the non-contact state performed by the contact state recognition unit 15A may not necessarily be based on the result of recognition whether the touch sensor 6 is normal or in failure.

In the second embodiment described above, the contact state recognition unit 15B may not necessarily recognize whether the right touch sensor 6a and the left touch sensor 6b are normal or in failure. In this case, the recognition of the one-hand contact state, the two-hand contact state or the non-contact state performed by the contact state recognition unit 15B may not necessarily be based on the result of recognition whether the right touch sensor 6a and the left touch sensor 6b are normal or in failure.

In the third embodiment described above, the gripping state recognition unit 15C may not necessarily recognize whether the gripping force sensor 7 is normal or in failure. In this case, the recognition of the gripping state or the non-gripping state performed by the gripping state recognition unit 15C may not necessarily be based on the result of recognition whether the gripping force sensor 7 is normal or in failure.

In the fourth embodiment described above, the gripping state recognition unit 15D may not necessarily recognize whether the right gripping force sensor 7a and the left gripping force sensor 7b are normal or in failure. In this case, the recognition of the one-hand gripping state, the two-hand gripping state, or the non-gripping state performed by the gripping state recognition unit 15D may not necessarily be based on the result of recognition whether the right gripping force sensor 7a and the left gripping force sensor 7b are normal or in failure.

In the first embodiment described above, for example, one sensor is provided over the entire circumference of the steering wheel as the touch sensor 6, however, the function of one touch sensor 6 may be realized by two or more sensors.

In the second embodiment described above, for example, one sensor is provided over the half circumference of the steering wheel on the right hand side of the driver as the right touch sensor 6a, however, the function of the right touch sensor 6a may be realized by two or more sensors. In the second embodiment described above, for example, one sensor is provided over the half circumference of the steering wheel on the left hand side of the driver as the left touch sensor 6b, however, the function of the left touch sensor 6b may be realized by two or more sensors.

In the third embodiment described above, for example, one sensor is provided over the entire circumference of the steering wheel as the gripping force sensor 7, however, the function of one gripping force sensor 7 may be realized by two or more sensors.

In the fourth embodiment described above, for example, one sensor is provided over the half circumference of the steering wheel on the right hand side of the driver as the right gripping force sensor 7a, however, the function of the right gripping force sensor 7a may be realized by two or more sensors. In the fourth embodiment described above, for example, one sensor is provided over the half circumference of the steering wheel on the left hand side of the driver as the left gripping force sensor 7b, the function of the left gripping force sensor 7b may be realized by two or more sensors.

In the first to fourth embodiments, as an application of the result of determination by the steering holding determination devices 50A to 50D, the autonomous driving systems 100A to 100D that perform the manual-driving switching control to switch the driving mode from the autonomous driving to the manual-driving based on the steering torque in the vehicle of which the driving mode can be switched between the autonomous driving and the manual-driving is exemplified, however, the present disclosure is not limited thereto. As the application of the result of determination by the steering holding determination devices 50A to 50D, for example, the result of determination of the driver's steering holding state may be applied to a notification to the driver, may be applied to a control other than the manual-driving switching control in the autonomous driving, or may be applied to a control of the driving support other than the autonomous driving.

In the first to fourth embodiments, the functions of the steering holding determination devices 50A to 50D and the functions of the autonomous driving systems 100A to 100D are integrally configured in the common ECUs 30A to 30D, but may be respectively configured in separate ECUs.

In the first to fourth embodiments, the torque recognition unit 14 recognizes the absolute value of the torsion torque of the steering shaft 22 detected by the torque sensor 5 as the steering torque, but the torsion torque of the steering shaft 22 detected by the torque sensor 5 may be recognized as a positive or negative valued steering torque.

In the first to fourth embodiments, the torque recognition unit 14 recognizes the steering torque using the detection value detected by the torque sensor 5 (the torsion torque of the steering shaft 22), however, inertia, viscosity and friction from the detection value detected by the torque sensor 5, and a torque estimation value in which the disturbance such as the torque from the rack and pinion mechanism 24 is compensated, may be used as the steering torque.

The manual-driving switching control may not necessarily be performed when informing the driver of "the approach of the vehicle to the switching location". For example, if there is an operation by the driver to cancel the autonomous driving (for example, an operation of pressing the autonomous driving cancel button) or if there is a brake pedal depression operation by the driver equal to or greater than a certain amount, it may be regarded by the manual-driving switching unit 18 that the driver indicates the intention of manual-driving. In this case, when the driver is notified that the driving mode can be switched to the manual-driving based on the steering operation and when it is determined by the steering holding determination unit 17 that the driver is in the steering holding state by the driver's steering operation in response to the notification, the manual-driving switching unit 18 may perform the manual-driving switching control.

Figure 26:
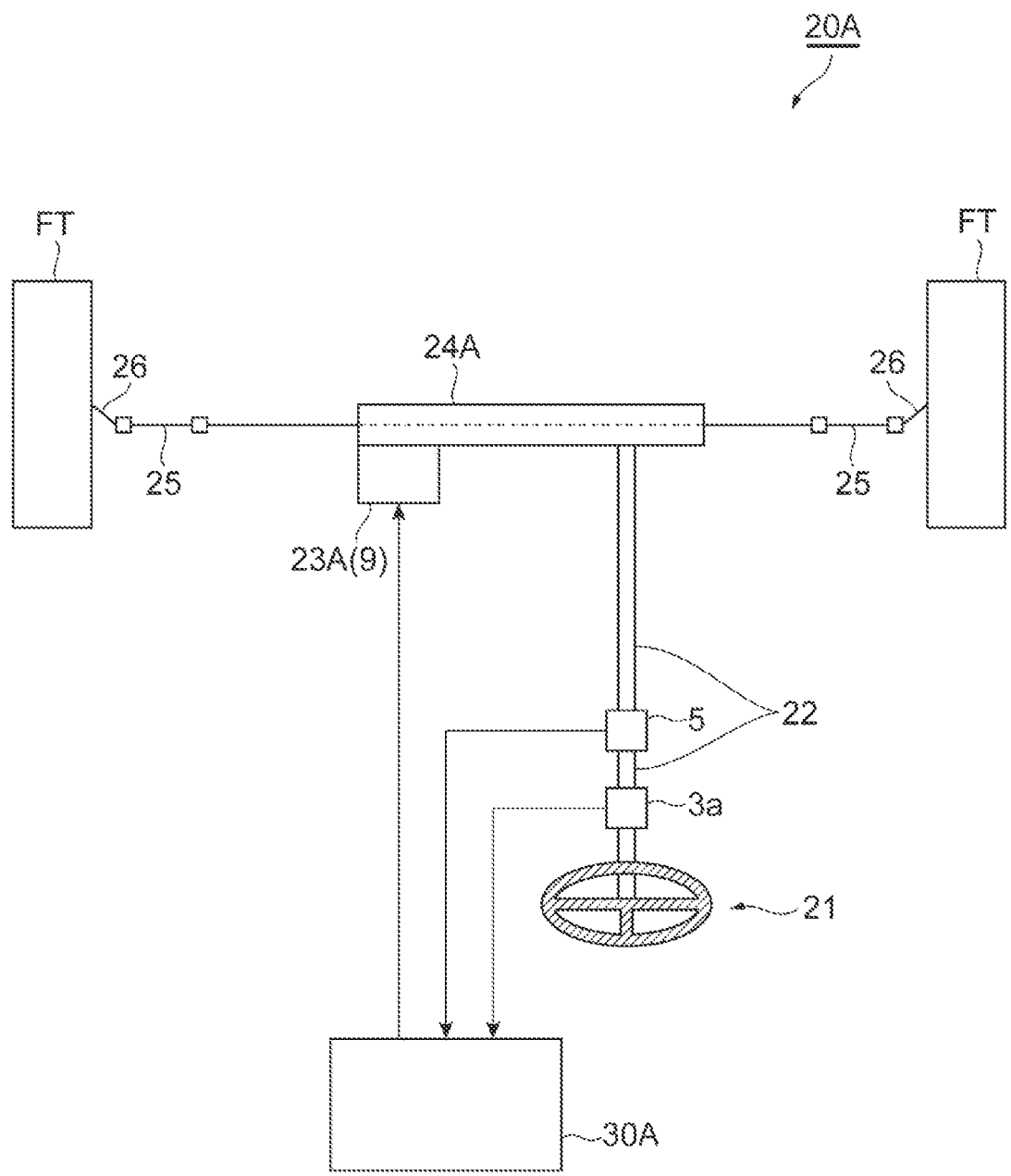
FIG. 26 is a schematic configuration diagram illustrating another example of the steering device.

In the embodiments described above, the steering device 20 illustrated in FIG. 2 is described as an example, but the configuration of the steering device is not limited to the configuration in FIG. 2. For example, as illustrated in FIG. 26, the steering device may be configured as a steering device 20A that includes an EPS motor 23A that applies assist torque to the steering rod or pinion rod of rack and pinion mechanism 24A instead of the EPS motor 23 that applies an assist torque to the steering shaft 22.

Figure 27:
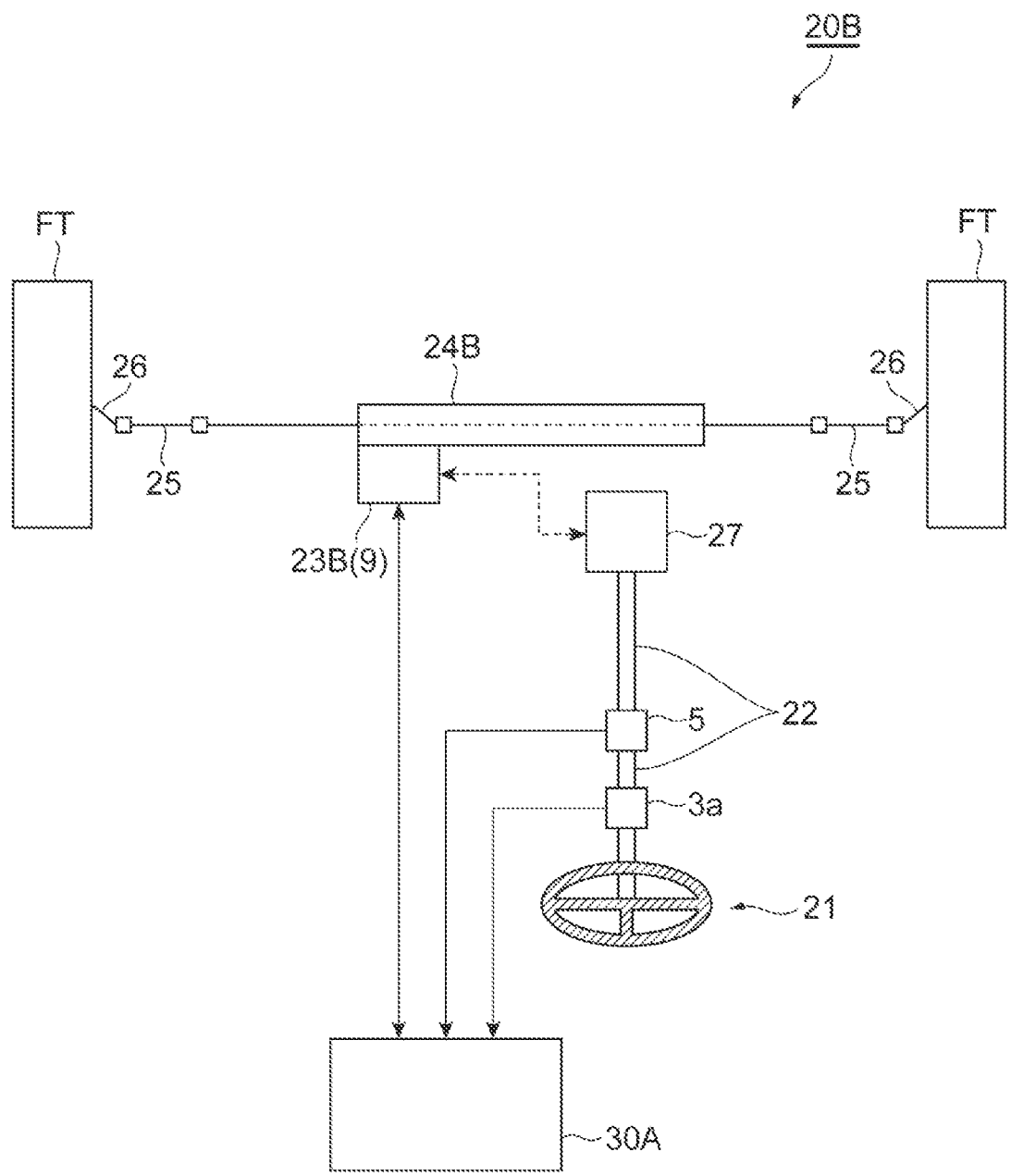
FIG. 27 is a schematic configuration diagram illustrating still another example of the steering device.

In addition, as illustrated in FIG. 27, the steering device may be configured as a steering device 20B (so-called a steer-by-wire) which includes an EPS motor 23B that applies the assist torque to the steering rod of a ball screw mechanism 24B and in which a reaction force actuator 27 simulating a reaction force from the road surface is connected to the steering shaft 22, instead of the EPS motor 23 that applies the assist torque to the steering shaft 22. This configuration is different from the steering device 20 in that the steering shaft 22 and the steering rod of the ball screw mechanism 24B are not physically connected, but other configurations are similar to the steering device 20.

The first embodiment described above may be combined with the third embodiment or the fourth embodiment. The second embodiment described above may be combined with the third embodiment or the fourth embodiment.

In some examples, a steering holding determination device includes a driver engagement state recognition unit configured to recognize an engagement state in which a driver's engagement with the steering wheel is detected, or a non-engagement state in which the driver's engagement is not detected, based on a result of detection performed by a steering wheel sensor provided on the steering wheel. A steering torque is compared with a threshold value to determine whether the driver is in the steering holding state. When the non-engagement state is recognized, the threshold value setting unit 16A, 16B, 16C, or 16D sets the threshold value to a larger value compared to a case when the engagement state is recognized by the driver engagement state recognition unit.

The driver engagement state recognition unit may include the above described contact state recognition unit 15A or contact state recognition unit 15B. The steering wheel sensor may include the above-described touch sensor 6 or (6a,6b). Accordingly, the engagement state may correspond to a contact state in which the driver's contact with the steering wheel is detected by the touch sensor, and the non-engagement state may correspond to a non-contact state in which the driver's contact with the steering wheel is not detected by the touch sensor.

The driver engagement state recognition unit may include the above described gripping state recognition unit 15C or gripping state recognition unit 15D. The steering wheel sensor may include the above-described gripping force sensor 7 or (7a,7b) to detect a gripping force. Accordingly, the engagement state may correspond to a gripping state in which the driver's gripping of the steering wheel is detected by the gripping force sensor, and the non-engagement state may correspond to a non-gripping state in which the driver's gripping of the steering wheel is not detected by the gripping force sensor.

In some examples, the driver engagement state recognition unit includes at least one of the contact state recognition unit 15A, the contact state recognition unit 15B, the gripping state recognition unit 15C, and gripping state recognition unit 15D.

The torque recognition unit 14, the driver engagement state recognition unit (15A, 15B, 15C, 15D), the threshold value setting unit (16A, 16B, 16C, 16D) and the steering holding determination unit 17 may be implemented by one or more processor (30A, 30B, 30C, 30D).

What is claimed is:

1. A steering holding determination device configured to determine a steering holding state in which a driver of a vehicle holds a steering wheel of the vehicle in a steerable manner, based on a steering torque of a steering shaft, the device comprising:
    a torque recognition unit configured to recognize the steering torque based on a result of detection performed by a torque sensor provided on the steering shaft;
    a contact state recognition unit configured to recognize a contact state in which a driver's contact to the steering wheel is detected or a non-contact state in which the contact is not detected, based on a result of detection performed by a touch sensor provided on the steering wheel;
    a first threshold value setting unit configured to set a first threshold value used for a determination of the steering holding state, based on a result of recognition performed by the contact state recognition unit; and
    a steering holding determination unit configured to determine that the driver is in the steering holding state, when the steering torque is equal to or greater than the first threshold value;
    wherein, when the non-contact state is recognized by the contact state recognition unit, the first threshold value setting unit sets the first threshold value to a larger value compared to a case when the contact state is recognized by the contact state recognition unit.

2. The steering holding determination device according to claim 1,
    wherein the contact state recognition unit is configured to recognize whether the touch sensor is normal or in failure, and
    wherein, when it is recognized that the touch sensor is in failure, the contact state recognition unit recognizes the non-contact state.

3. The steering holding determination device according to claim 1,
    wherein the touch sensor is configured to include a right touch sensor and a left touch sensor,
    wherein the contact state recognition unit is configured to recognize the contact state while dividing the contact state into a two-hand contact state in which the contact is detected by the right touch sensor and the left touch sensor and a one-hand contact state in which the contact is detected by the right touch sensor or the left touch sensor based on a result of detection performed by the right touch sensor and the left touch sensor, and
    wherein, when the one-hand contact state is recognized by the contact state recognition unit, the first threshold value setting unit sets the first threshold value to a larger value compared to a case when the two-hand contact state is recognized by the contact state recognition unit.

4. The steering holding determination device according to claim 3,
    wherein the contact state recognition unit is configured to recognize whether each of the right touch sensor and the left touch sensor is normal or in failure, and
    wherein, if it is recognized that any one of the right touch sensor and the left touch sensor is normal and the other is in failure, and when the contact is detected by the right touch sensor or the left touch sensor which is recognized as normal, the contact state recognition unit recognizes the two-hand contact state.

5. An autonomous driving system configured to perform a manual-driving switching control to switch a driving mode from an autonomous driving to a manual-driving based on a steering torque in a vehicle of which the driving mode can be switched between the autonomous driving and the manual-driving, the system comprising:
    the steering holding determination device according to claim 1; and
    a manual-driving switching unit configured to perform the manual-driving switching control when it is determined by the steering holding determination unit that the driver is in the steering holding state during the autonomous driving.

6. A steering holding determination device configured to determine a steering holding state in which a driver of a vehicle holds a steering wheel of the vehicle in a steerable manner, based on a steering torque of a steering shaft, the device comprising:
    a torque recognition unit configured to recognize the steering torque based on a result of detection performed by a torque sensor provided on the steering shaft;
    a gripping state recognition unit configured to recognize a gripping state in which a driver's gripping of the steering wheel is detected, or a non-gripping state in which the driver's gripping is not detected, based on a gripping force detected by a gripping force sensor provided on the steering wheel;
    a second threshold value setting unit configured to set a second threshold value used for a determination of the steering holding state, based on a result of recognition performed by the gripping state recognition unit; and
    a steering holding determination unit configured to determine that the driver is in the steering holding state, when the steering torque is equal to or greater than the second threshold value,
    wherein, when the non-gripping state is recognized by the gripping state recognition unit, the second threshold value setting unit sets the second threshold value to a larger value compared to a case when the gripping state is recognized by the gripping state recognition unit.

7. The steering holding determination device according to claim 6,
    wherein the gripping state recognition unit is configured to recognize whether the gripping force sensor is normal or in failure, and
    wherein, when it is recognized that the gripping force sensor is in failure, the gripping state recognition unit recognizes the non-gripping state.

8. The steering holding determination device according to claim 6,
- wherein the gripping force sensor is configured to include a right gripping force sensor and a left gripping force sensor,
- wherein the gripping state recognition unit is configured to recognize the gripping state while dividing the gripping state into a two-hand gripping state in which the driver's gripping is detected by the right gripping force sensor and the left gripping force sensor and a one-hand gripping state in which the gripping state is detected by the right gripping force sensor or the left gripping force sensor based on the result of detection performed by the right gripping force sensor and the left gripping force sensor, and
- wherein, when the one-hand gripping state is recognized by the gripping state recognition unit, the second threshold value setting unit sets the second threshold value to a larger value compared to a case when the two-hand gripping state is recognized by the gripping state recognition unit.

9. The steering holding determination device according to claim 8,
- wherein the gripping state recognition unit is configured to recognize whether each of the right gripping force sensor and the left gripping force sensor is normal or in failure, and
- wherein, if any one of the right gripping force sensor and the left gripping force sensor is recognized as normal and the other is in failure, and when the driver's gripping is detected by the right gripping force sensor or the left gripping force sensor which is recognized as normal, the gripping state recognition unit is configured to recognize the two-hand gripping state.

10. An autonomous driving system configured to perform a manual-driving switching control to switch a driving mode from an autonomous driving to a manual-driving based on a steering torque in a vehicle of which the driving mode can be switched between the autonomous driving and the manual-driving, the system comprising:
- the steering holding determination device according to claim 6; and
- a manual-driving switching unit configured to perform the manual-driving switching control when it is determined by the steering holding determination unit that the driver is in the steering holding state during the autonomous driving.

\* \* \* \* \*